(12) United States Patent
Motomura et al.

(10) Patent No.: US 11,181,647 B2
(45) Date of Patent: Nov. 23, 2021

(54) DETECTION ELEMENT, PRODUCTION METHOD FOR DETECTION ELEMENT, AND DETECTION DEVICE

(71) Applicant: DAI NIPPON PRINTING CO., LTD., Tokyo (JP)

(72) Inventors: Tomohisa Motomura, Tokyo (JP); Osamu Shimada, Tokyo (JP); Ryoichi Ohigashi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/005,841

(22) Filed: Aug. 28, 2020

(65) Prior Publication Data
US 2020/0393575 A1 Dec. 17, 2020

Related U.S. Application Data

(63) Continuation of application No. PCT/JP2019/007524, filed on Feb. 27, 2019.

(30) Foreign Application Priority Data

Feb. 28, 2018 (JP) .............................. JP2018-034548

(51) Int. Cl.
*G01T 1/18* (2006.01)
*G01T 1/185* (2006.01)

(52) U.S. Cl.
CPC .................................... *G01T 1/185* (2013.01)

(58) Field of Classification Search
CPC .. G01T 1/18; G01T 1/185; G01T 1/20; G01T 1/2018
See application file for complete search history.

(56) References Cited

U.S. PATENT DOCUMENTS 5,602,397 A    2/1997   Pitts et al.
5,742,061 A * 4/1998   Lemonnier ............. H01J 47/06
                                                                                           250/374

(Continued)

FOREIGN PATENT DOCUMENTS

JP    2002-090465 A    3/2002
JP    2007-078653 A    3/2007
(Continued)

OTHER PUBLICATIONS

May 28, 2019 International Search Report issued in International Patent Application No. PCT/JP2019/007524.
(Continued)

*Primary Examiner* — David P Porta
*Assistant Examiner* — Fani Boosalis
(74) *Attorney, Agent, or Firm* — Oliff PLC

(57) ABSTRACT

A Detection element includes a substrate having a first surface and a second surface opposing the first surface, substrate comprising: a substrate provided with a through hole having inner diameters that differ from each other at two points along the thickness of substrate; a through electrode disposed in through hole; a first electrode connected to through electrode and disposed on the first surface; a patterned electrode connected to through electrode and disposed on the second surface; and a second electrode disposed on the first surface and spaced apart from the first electrode.

20 Claims, 14 Drawing Sheets

(56) References Cited

U.S. PATENT DOCUMENTS

| | | | |
|---|---|---|---|
| 8,207,505 B2* | 6/2012 | Motomura | G01T 1/185 250/385.1 |
| 2002/0134945 A1* | 9/2002 | Tanimori | G01T 1/185 250/385.1 |
| 2015/0115992 A1 | 4/2015 | Fushie et al. | |
| 2018/0081069 A1 | 3/2018 | Oota et al. | |
| 2018/0246226 A1 | 8/2018 | Ota et al. | |

FOREIGN PATENT DOCUMENTS

| | | |
|---|---|---|
| JP | 2009-224069 A | 10/2009 |
| JP | 2009-264997 A | 11/2009 |
| JP | 2013-011623 A | 1/2013 |
| JP | 2013-181800 A | 9/2013 |
| JP | 2013-254584 A | 12/2013 |
| JP | 2015-111057 A | 6/2015 |
| WO | 2013/157975 A1 | 10/2013 |
| WO | 2016/166970 A1 | 10/2016 |
| WO | 2017/061336 A1 | 4/2017 |

OTHER PUBLICATIONS

May 28, 2019 Written Opinion of the International Searching Authority issued in International Patent Application No. PCT/JP2019/007524.
May 28, 2019 International Search Report issued in International Patent Application No. PCT/JP2019/007599.
May 28, 2019 Written Opinion of the International Searching Authority issued in International Patent Application No. PCT/JP2019/007599.
Oct. 15, 2019 Office Action issued in Japanese Patent Application No. 2018-034548.
Oct. 29, 2019 Office Action issued in Japanese Patent Application No. 2018-034549.
Oct. 11, 2021 Extended Search Report issued in European Patent Application No. 19759986.3.
Homma et al; "Study of deposit associated with discharge in micro-pixel gas chamber," Nuclear Instruments & Methods in Physics Research; vol. 599; No. 1; pp.47-52; Feb. 1, 2009.

* cited by examiner

DETECTION ELEMENT, PRODUCTION METHOD FOR DETECTION ELEMENT, AND DETECTION DEVICE

CROSS REFERENCES TO RELATED APPLICATIONS

This application is based upon and claims the benefit of priority from the prior International Application PCT/JP2019/007524, filed on Feb. 27, 2019, and the prior Japanese Patent Application 2018-034548, filed on Feb. 28, 2018, the entire contents of which are incorporated herein by reference.

FIELD

Embodiments of the present disclosure relate to a detection element, a production method for detection element, and a detection device.

BACKGROUND

Research on radiation detection device using gas amplification with pixel-type electrodes is underway. The radiation detection device using gas amplification with pixel-type electrodes has a feature that a large area and real-time imaging can be performed in the detection region, which is not sufficient for radiation detection by a conventional detection device, particularly in image imaging.

Regarding the structure of the radiation detection device using gas amplification by pixel-type electrodes, for example, Japanese Laid-Open Patent Application Publication No. 2015-111057 can be referred to.

SUMMARY

A detection element according to an embodiment of the present disclosure includes a substrate having a first surface and a second surface opposite to the first surface, the substrate arranged with a through hole having different inner diameters at two points along a thickness direction of the substrate, a through electrode arranged in the through hole, a first electrode connected to the through electrode, the first electrode arranged on the first surface, a patterned electrode connected to the through electrode, the patterned electrode arranged on the second surface, and a second electrode arranged on the first surface, the second electrode separated from the first electrode.

A production method for detection element according to an embodiment of the present disclosure includes forming a through hole on a substrate having a first surface and a second surface opposite to the first surface, the through hole having different inner diameters at two points along a thickness direction of the substrate, forming a through electrode in the through hole, forming a first electrode connected to the through electrode and a second electrode separated from the first electrode on the first surface, and forming a patterned electrodes connected to the through electrode on the second surface.

DESCRIPTION OF EMBODIMENTS

Figure 1:
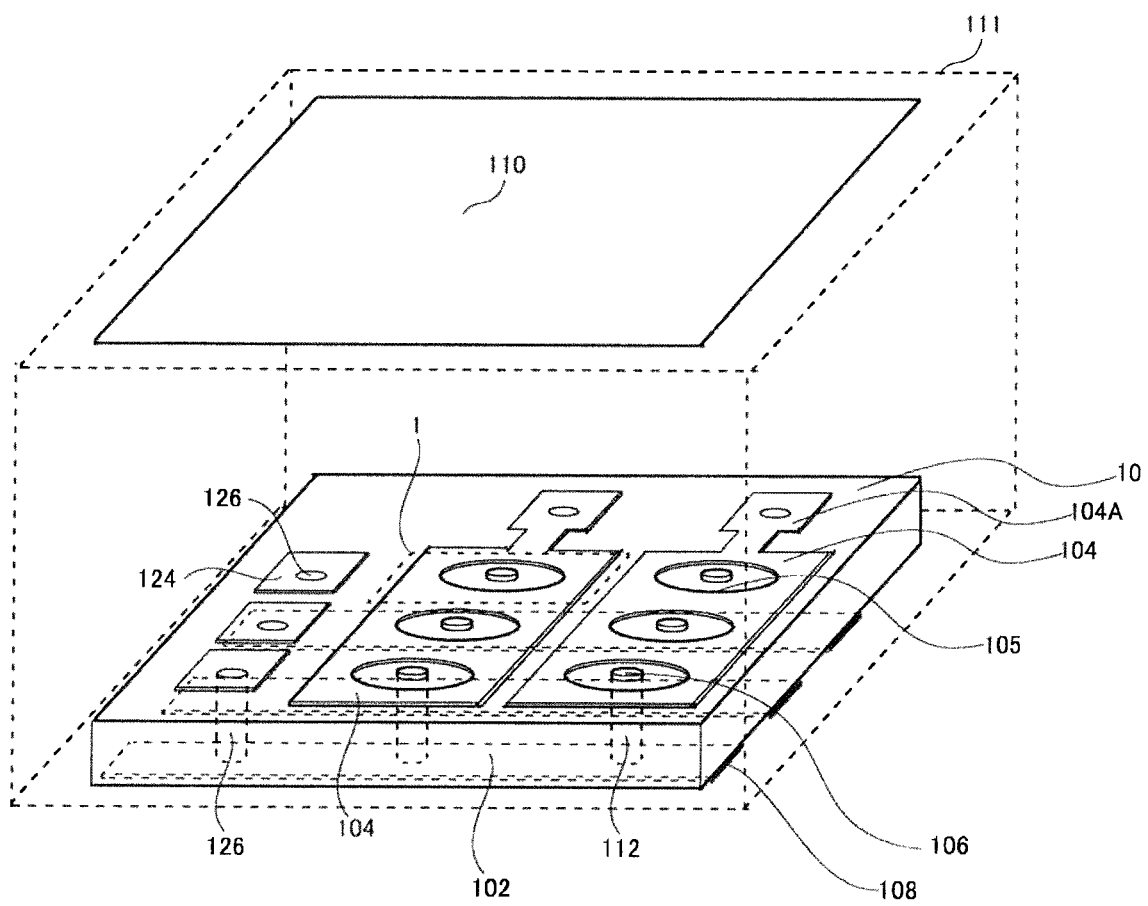
FIG. 1 is a diagram showing an example of the radiation detection device including a detection element according to an embodiment of the present disclosure.

Hereinafter, the detection element and the detection device of the present disclosure will be described in detail with reference to the drawings. The detection element and the detection device of the present disclosure are not limited to the following embodiments, and may be implemented with various modifications. In all the embodiments, the same components are given by the same reference numerals. For convenience of description, the dimensional ratio of the drawings may be different from the actual ratio, or a part of the configuration may be omitted from the drawings. For convenience of explanation, the phrase "above" or "below" is used for explanation, but, for example, the vertical relation between the first member and the second member may be reversed from that shown in the drawing. In the following description, the first surface and second surface of the substrate do not refer to a specific surface of the substrate, but are used to specify the front surface direction or back surface direction of the substrate, that is, to specify the vertical direction with respect to the substrate.

In the radiation detection device with pixel-type electrodes, radiation (charged particle) generates ionizing electron by interacting with the gas filled in the detection device and indirectly detects radiation by capturing the ionizing electron with the pixel-type electrode. The track of radiation can be detected by identifying the position and time of the pixel-type electrodes that has captured the ionizing electron. In the radiation detection device as disclosed in Patent Document 1 (hereinafter referred to as "conventional radiation detection device"), detection element having a through electrode based on silicon formed with an oxide layer on its surface has been used in order to obtain a sufficient gas amplification factor. However, for the detection of environmental radiation with large radiation doses, the electric field of the pixel-type electrode on the surface of the detection element may change, the movement of the ionizing electron may be disturbed, and the ionizing electron may not be captured by the pixel-type electrode at a predetermined position. As a result, it has been difficult to stably obtain a high gas amplification factor.

An object of the embodiment of the present disclosure is to provide a radiation detection element capable of stably obtaining a high gas amplification factor even in the detection of environmental radiation with high radiation doses.

<Background of the Present Invention>

In the conventional radiation detection device, a detection element having a through electrode based on silicon formed with an oxide layer on its surface has been used. However, in the detection of environmental radiation with high radiation doses, it has been found that the silicone substrate is converted to other atoms such as phosphorus by being irradiated with neutron and becomes electrically conductive. In other words, it was found that the electric field of the pixel-type electrode on the surface of the detection element is easily disturbed by the conduction of the silicon substrate and the leakage of the current from the oxide layer on the surface of the substrate at the same time. By using silicon having the oxide layer formed on its surface as a substrate, parasitic capacity due to the oxide layer on the surface may cause disturbance of the electric field of the pixel-type electrodes. Further, in an environment in which the gas filled in the detection device cannot be exchanged, the deterioration of the gas in the detection device due to the generation of the gas from the insulating resin also becomes a problem. As a result of extensive studies, the present discloser has come to the present invention in order to solve the above problems.

First Embodiment

[Configure of the Radiation Detection Device 100]

Referring to FIG. 1, an outline of a configuration of a radiation detection device 100 including a radiation detection element 10 according to an embodiment of the present disclosure will be described. The radiation detection device 100 according to the present embodiment includes a drift electrode 110, a radiation detection element 10, and a chamber 111. The drift electrode 110 and the radiation detection element 10 are arranged oppositely within the chamber 111 with a certain space. The chamber 111 is filled with a mixed gas of a rare gas such as argon or xenon and a gas (quenching gas) having a quenching action containing an alkane or carbon dioxide of a gas at an room temperature such as ethane or methane. These gases may be enclosed in the chamber 111 alone, or two or more kinds of mixed gases may be enclosed.

The radiation detection element 10 according to an embodiment of the present disclosure includes an insulation member 102, cathode electrode 104, anode electrode 106, anode patterned electrode 108 and an anode through electrode 112. As shown in FIG. 1, a plurality of cathode electrodes 104 is arranged on the first surface of the insulation member 102. The cathode electrode 104 has a plurality of opening parts 105. Since the cathode electrodes 104 are formed in strip shape, it is also referred to as cathode strip electrode.

The anode electrode 106 is arranged in each of the plurality of opening parts 105 of the cathode electrode 104. The anode electrode 106 is arranged so as to be separated from the cathode electrode 104 and exposed to the first surface of the insulation member 102. The anode electrode 106 is connected to the anode through electrode 112 and the anode patterned electrode 108. The anode through electrode 112 is arranged in a through hole that connects the insulation member 102 from the first surface to the second surface opposite to the first surface of the insulation member 102. The anode patterned electrode 108 is arranged on the second surface of the insulation member 102. That is, the anode electrode 106 is connected to the anode through electrode 112 on the first surface of the insulation member 102, and the anode through electrode 112 is connected to the anode patterned electrode 108 on the second surface of the insulation member 102. The structure of the anode electrode 106, the anode through electrode 112, and the anode patterned electrodes 108 will be described in detail later. The anode patterned electrode 108 is connected to the plurality of the anode through electrodes 112, and the plurality of the anode through electrodes 112 are connected to a plurality of anode electrodes 106 respectively. The plurality of anode patterned electrodes 108 are arranged on the second surface of the insulation member 102.

In the present embodiment, the extending direction of the plurality of cathode electrodes 104 and the extending direction of the anode pattern electrodes 108 connected to the plurality of anode electrodes 106 are substantially orthogonal to each other. The anode electrode 106 is arranged at a position where the cathode electrode 104 and the anode pattern electrode 108 intersect. In other words, the anode electrodes 106 are arranged in a matrix along the extending direction of the cathode electrode 104 and the extending direction of the anode patterned electrode 108. Here, the present embodiment exemplifies a configuration in which the extending direction of the cathode electrode 104 and the extending direction of the anode pattern electrode 108 are substantially orthogonal to each other, but the present invention is not limited to this configuration. The direction in which the cathode electrode 104 extends and the direction in which the anode pattern electrode 108 extends may be different, and may be configured to intersect each other at an angle, for example.

Lead wiring 124 is further arranged on the first side of the insulation member 102. The anode electrode 106 is connected to this lead wiring 124 via the anode through electrode 112, the anode patterned electrodes 108, an interlayer connection part 126. That is, the anode electrode 106, the anode through electrode 112, the anode patterned electrode 108, the interlayer connection part 126, and the lead wiring 124 are one conductor, and the lead wiring 124 serves as a connecting terminal for the anode electrode 106. In the present embodiment, the anode electrode 106, the anode through electrode 112, the anode pattern electrode 108, the interlayer connection part 126, and the lead wiring 124 are provided separately, and each of them is electrically connected, but not limited thereto. For example, part or all of the anode electrode 106, the anode through electrode 112, the anode pattern electrodes 108, the interlayer connection part 126, and the lead wiring 124 may be integrally formed. Since the anode pattern electrode 108 is formed in striped shape, also referred to as an anode strip pattern. The anode electrode 106 may be referred to as a first electrode, the cathode electrode 104 may be referred to as a second electrode, and the drifting electrode 110 may be referred to as a third electrode.

A glass substrate can be used as the insulation member 102 according to an embodiment of the present invention. In particular, it is preferable to use a non-alkaline glass containing no alkali metal and containing an alkaline earth metal oxide as a main component. Non-alkaline glass is preferable as the material of the insulation member 102 because it has meltability, is easy to process, and has excellent electric insulating properties. By using glasses for the insulation member 102, even when a large amount of radiation is irradiated and silicon is converted to phosphorus, the insulating properties can be maintained by oxygen-mediated bonding, and a stable high gas amplification factor can be obtained. By using glass for the insulation member 102, the concavo-convex structure of the inner surface of a penetrating hole 103 penetrating the insulation member 102 can be suppressed, and the aspect ratio of the penetrating hole 103 to be described later can be formed in the range of 4 or more and 8 or less. By using an insulation material as a substrate, problems of parasitic capacity due to an oxide layer or the like can be suppressed when a silicon base material having an oxide layer formed on its surface is used. In addition, the absence of an insulating resin layer can prevent the generation of gas from the resin materials in the chamber in which the gas is sealed.

The thickness of the insulation member 102 is not particularly limited, for example, a substrate having a thickness of 200 μm or more and 700 μm or less can be used. The thickness of the insulation member 102 is more preferably 350 μm or more 450 μm or less. If the substrate becomes thinner than the lower limit of the substrate thickness above, the deflection of the substrate becomes larger. This makes it difficult to handle during the manufacturing process, and the internal stress of thin film, etc. formed on the substrate causes a problem that the substrate is warped and the substrate is cracked. If the substrate is thicker than the upper limit of the substrate thickness above, the process of forming a through hole becomes long. As a result, the manufacturing process is prolonged and the manufacturing cost is increased.

The material of the cathode electrode 104, the anode electrode 106, the anode through electrode 112, the anode pattern electrode 108, the interlayer connection part 126, and the lead wiring 124 according to the present embodiment is copper (Cu), but not limited to a metallic material having conductivity. A material selected from metals such as gold (Au), silver (Ag), platinum (Pt), palladium (Pd), rhodium (Rh), tin (Sn), aluminum (Al), nickel (Ni), and chromium (Cr), or alloys using these metals can be used.

The lead wiring 124 may further include a first metal layer 120 and a second metal layer 122. Here, the first metal layer 120 functions as a connecting terminal with an external device. Therefore, it is arranged to ensure a good electrical connection with the connection terminal provided in the external device. As the first metal layer 120, for example, a material such as Au, Ag, or Pt can be used. The second metal layer 122 functions as a barrier layer for preventing metal atoms from diffusing and mixing between the first metal layer 120 and the lead wiring 124. Therefore, the second metal layer 122 can be used a material capable of suppressing the diffusion of the material used in each of the first metal layer 120 and the lead wiring 124. The second metal layer 122, for example, Ni, Pd, Ti, Ta, titanium nitride (TiN), can be used a material such as tantalum nitride (TaN).

Here, the smallest repeating unit of the pixel electrode including a part of the cathode electrode 104, the opening part 105, the anode electrode 106, and the insulation member 102 is defined as a pixel electrode 1. The pixel electrode 1 is generally square. If the length of one side of the pixel electrode is P, the minimum repeating unit (pitch) of the cathode electrode 104 and the minimum repeating unit (pitch) of the anode electrode 106 are also P. Although six pixel electrodes 1 in one radiation detection element 10 are shown in FIG. 1, not limited thereto. The radiation detection element 10 may have a plurality of pixel electrodes 1. The radiation detection device 100 detects radiation incident between the pixel electrode 1 and the drift electrode 110 by radiation detection element 10.

[Principles of Radiation Detection]

Figure 2:
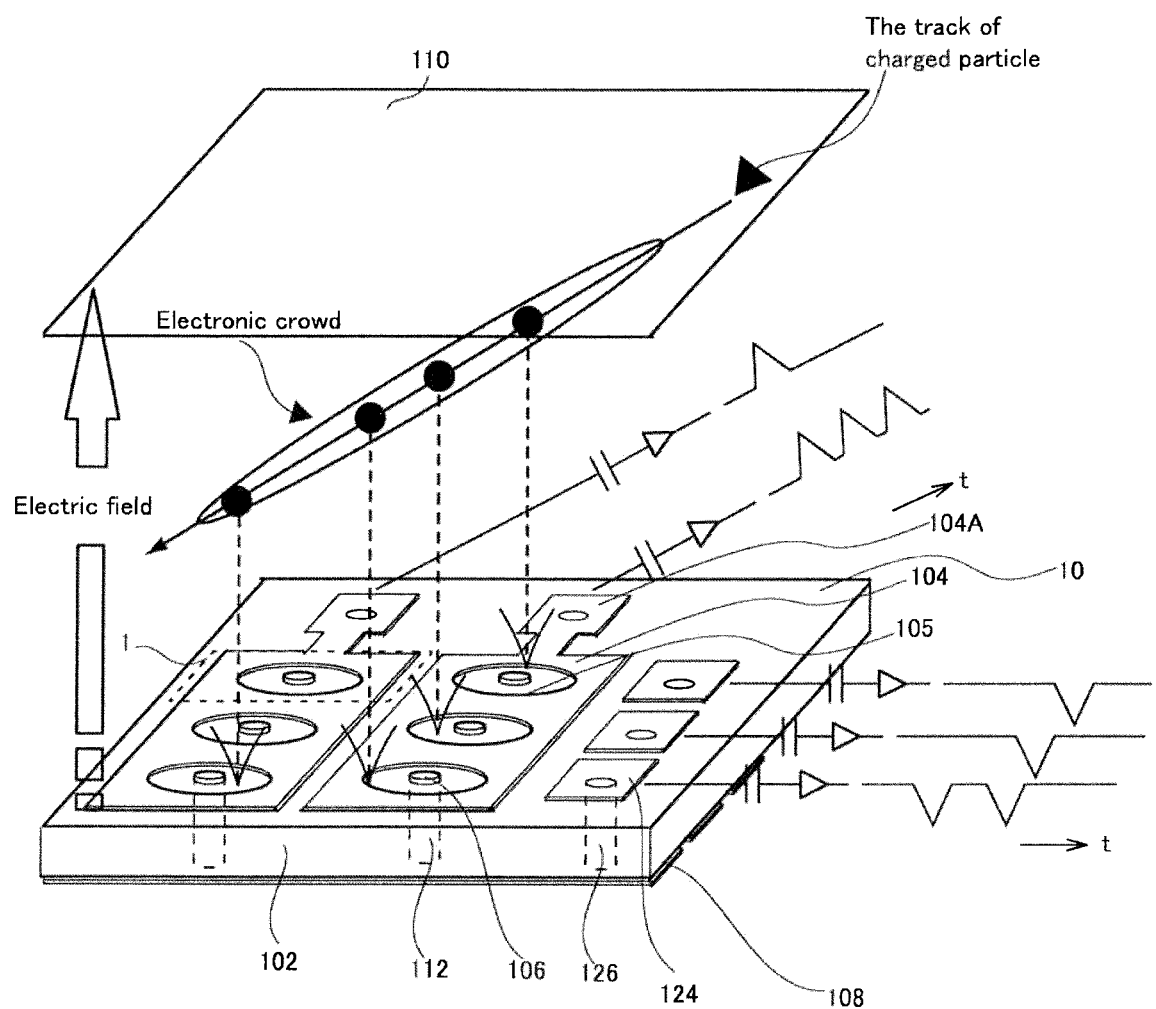
FIG. 2 is a diagram showing an operation principle of a radiation detection device according to an embodiment of the present disclosure.

FIG. 2 shows an operation principle of the radiation detection device according to an embodiment of the present invention. An electric field is formed by applying a voltage between respective cathode electrodes 104 and anode electrode 106. The cathode electrode 104 is connected to the ground (GND), and the voltage is applied between the drift electrode 110 and the cathode electrode 104 to form an electric field.

When radiation is incident, the radiation forms an electronic crowd by the interaction with the gas present in the chamber 111 due to the impact of the electric field generated between the drift electrode 110 and the cathode electrode 104. Each electron of the electronic crowd is attracted toward the pixel electrode 1 consisting of the anode electrode 106 and the cathode electrode 104. At this time, the attracted electrons collide with the gas atoms and ionize the gas atoms. The electrons ionized by the gas amplification proliferate like an avalanche, and the electrons group collected by the anode electrode 106 reaches such an extent that they can be read out as electric signals. Then, the electric signal can be read out from the lead wiring 124 which is a connecting terminal through the anode pattern electrode 108 to the outside. On the other hand, positive charges induced by the electrons are generated at the cathode electrode 104, and electric signals obtained from the positive charges can be read out to the outside from the connecting terminal 104A of the cathode electrode. By measuring these electric signals in time series, the track of charged particle can be measured.

[Configuration of the Pixel Electrode]

Figure 3:
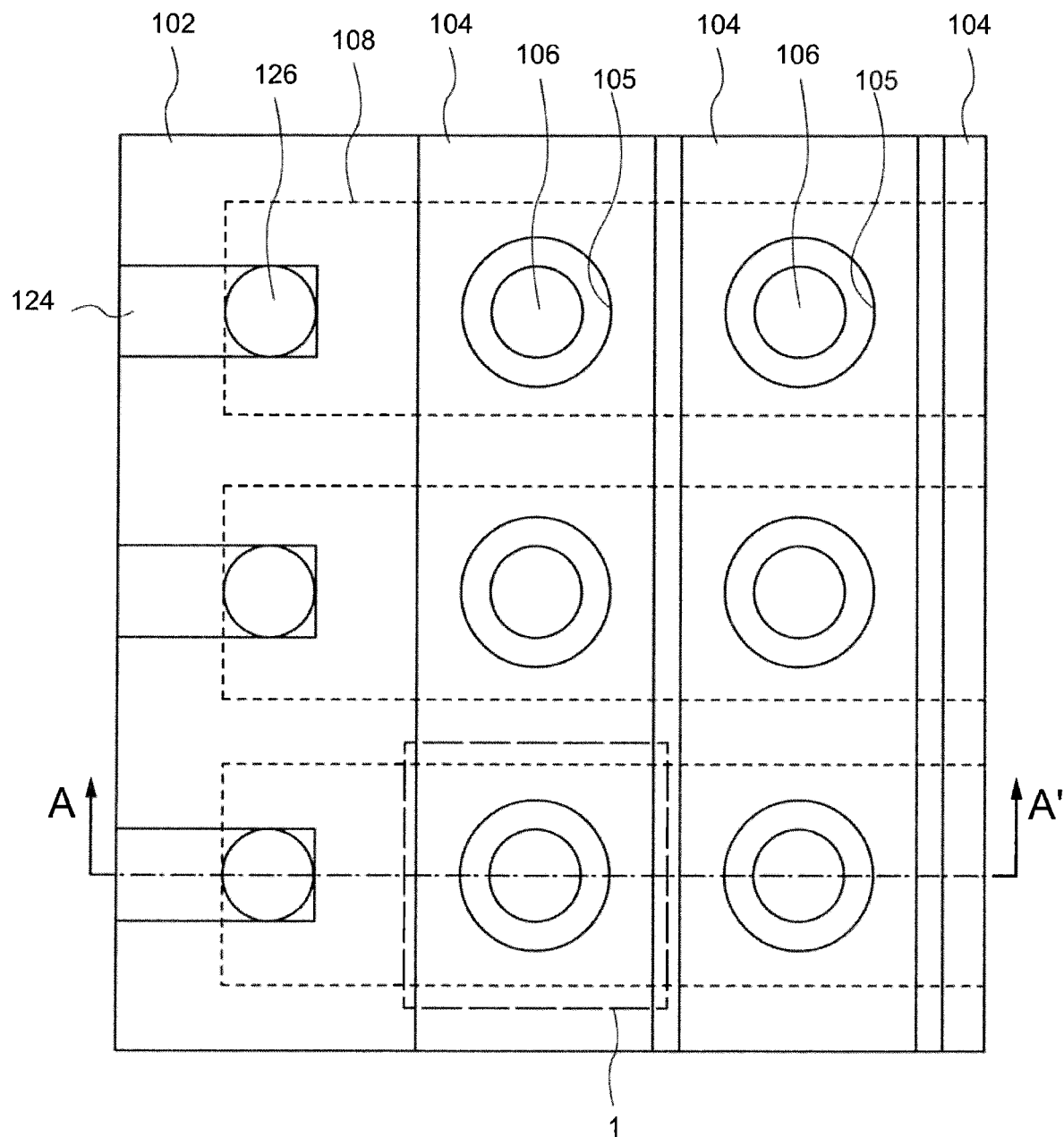
FIG. 3 is a plan view of a portion of a detection element according to an embodiment of the present disclosure.
Figure 4A:
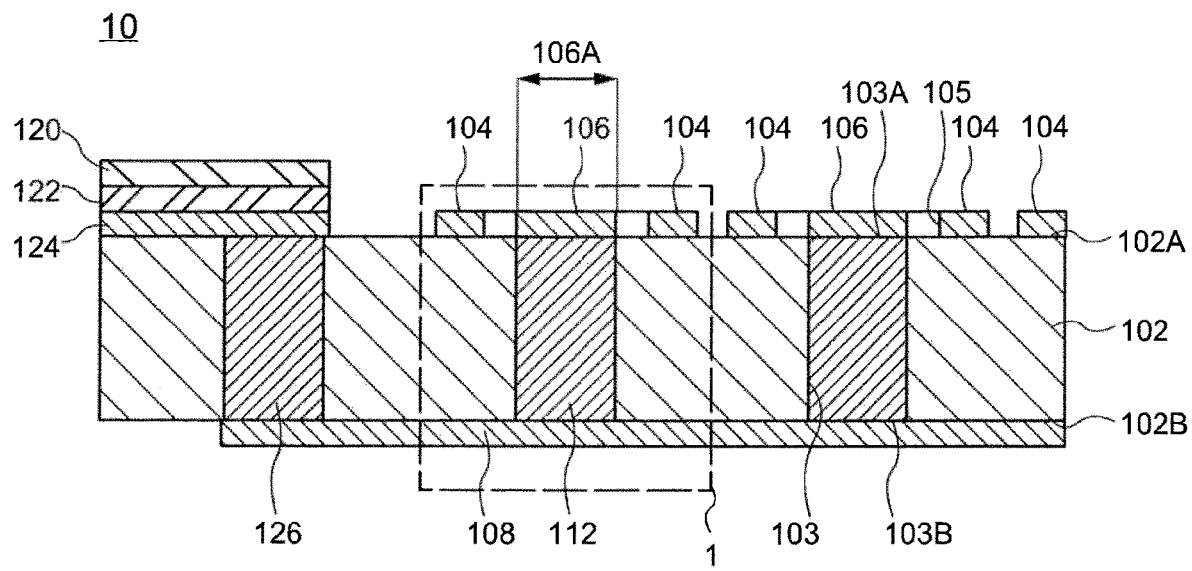
FIGS. 4A to 4C are a cross-sectional view of a portion of a detection element according to an embodiment of the present disclosure.

Next, the configuration of the pixel electrode 1 included in the radiation detection element 10 according to the present embodiment will be described in detail with reference to FIGS. 3 and 4A to 4C. FIG. 3 is a plan view of a portion of the radiation detection element 10 according to an embodiment of the present disclosure. FIG. 4A is a cross-sectional view of a portion of the radiation detection element 10 according to an embodiment of the present disclosure. FIG. 4A is an A-A' cross-sectional view of FIG. 3.

As shown in FIGS. 3 and 4A, the pixel electrode 1 of the radiation detection element 10 has the insulation member 102, the anode electrode 106 (first electrode), the anode through electrode 112, the anode pattern electrode 108, and the cathode electrode 104 (second electrode). As shown in FIG. 3, the cathode electrode 104 is arranged with the opening part 105 so as to surround the anode electrode 106. The cathode electrode 104 is arranged apart from the anode electrode 106. That is, the cathode electrode 104 and the anode electrode 106 are insulated. Here, FIG. 3 shown the configuration in which the anode electrode 106 is provided in the opening part 105 of the cathode electrode 104 so that the distance between the cathode electrode 104 and the anode electrode 106 is constant in all directions with respect to the anode electrode 106, but the configuration is not limited to this. For example, the distance between the cathode electrode 104 and the anode electrode 106 may be closer to each other in a certain direction with respect to the anode electrode 106 than in the other directions. By doing so, the detection sensitivity can be increased in the above-mentioned certain direction. In FIG. 3, the cathode electrode 104 has exemplified the configuration surrounding the anode electrode 106, a portion of the cathode electrode 104 may be open.

As shown in FIG. 4A, the anode electrode 106 is arranged to be exposed to the first surface 102A of the insulation member 102. In the present embodiment, the anode electrode 106 has a shape in which the tip protrudes from the first surface 102A of the insulation member 102 in each of the opening part 105. However, the anode electrode 106 may have a shape in which the tip does not protrude in each of the opening part 105 (a shape in which the tip substantially matches with the first surface 102A of the insulation member 102, or a shape in which the tip is located inside the insulation member 102). However, by making the height of the cathode electrode 104 and the height of the anode electrode 106 substantially the same on the first surface 102A of the insulation member 102, electric lines of force are generated not only between the upper surface portion of the cathode electrode 104 and the upper surface portion of the anode electrode 106 but also between the side surface portions thereof, thereby improving the gas amplification factor.

The anode electrode 106 is connected to the anode through electrode 112 disposed in the penetrating hole 103 on the first side 102A of the insulation member 102. Although FIG. 4A shows a configuration in which the anode through electrode 112 is filled in the penetrating hole 103, the present invention is not limited to this. The anode through electrode 112 may be electrically connected to the anode electrode 106. For example, the anode through electrode 112 may be arranged on the inner surface of the penetrating hole 103 and the interior of the anode through electrode 112 may be filled with a cavity or an insulating resin or the like.

The penetrating hole 103 connects from the first surface 102A to a second surface 102B of the insulation member 102. In this embodiment, the penetrating hole 103 and the anode through electrode 112 are cylindrical. That is, the penetrating hole 103 has substantially the same inner diameter in the thickness direction of the insulation member 102. Here, the inner diameter of the penetrating hole 103 indicates the maximum diameter, the length of two points where the distance on the contour line of the penetrating hole 103 in the cross section perpendicular to the thickness direction of the insulation member 102 of the penetrating hole 103 is maximum. Therefore, the inner diameter of a first penetrating end 103A on the first surface 102A side of the penetrating hole 103 and the inner diameter of a second penetrating end 103B on the second surface 102B side of the penetrating hole 103 are substantially the same.

The aspect ratio of the penetrating hole 103 is preferably in the range of 4 or more and 8 or less. Here, the aspect ratio of the penetrating hole 103 is defined as the depth of the penetrating hole 103 (the thickness of the insulation member 102) with respect to the inner diameter of the penetrating hole 103 (when the penetrating hole 103 has a different inner diameter in the thickness direction of the insulation member 102, taking the maximum value). If the aspect ratio of the penetrating hole 103 is larger than 8, it becomes difficult to form a conductive layer over the entire depth of the penetrating hole 103 on the inner surface of the penetrating hole 103 when forming the anode through electrode 112 to be described later. If the aspect ratio of the penetrating hole 103 is less than 4, it becomes difficult to form a fine pixel electrode 1 in the radiation detection element 10 when the thickness of the insulation member 102 is maintained at a constant or more.

Figure 4B:
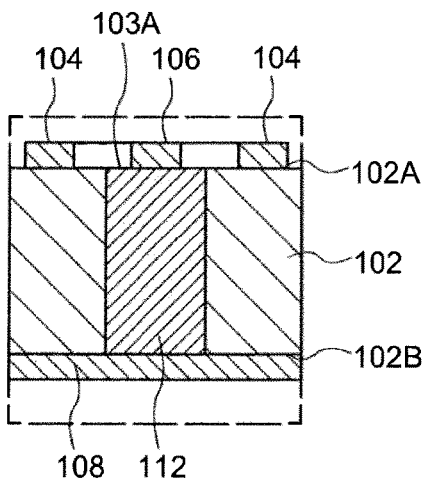
Figure 4C:
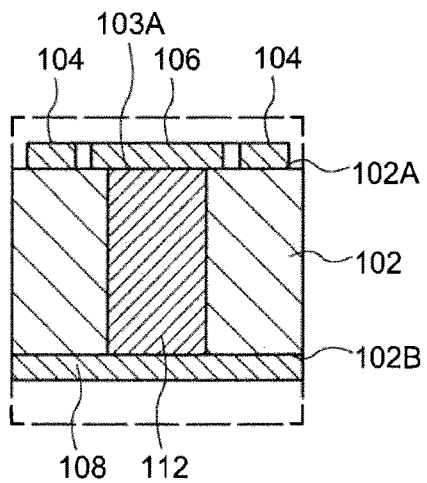

In the present embodiment, the inner diameter of the first penetrating end 103A on the first surface 102A side of the penetrating hole 103 is substantially the same as a diameter 106A of the anode electrode 106. Here, the diameter 106A of the anode electrode 106 indicates the largest diameter on the upper surface of the anode electrode 106 opposite to the first surface 102A. However, the present invention is not limited to this. FIGS. 4B and 4C are cross-sectional view of a portion of the radiation detection element of the modified example of the present embodiment. As shown in FIG. 4B, the diameter 106A of the anode electrode 106 may be smaller than the inner diameter of the first penetrating end 103A on the first surface 102A side of the penetrating hole 103. As shown in FIG. 4C, the diameter 106A of the anode electrode 106 may be larger than the inner diameter of the first penetrating end 103A on the first surface 102A side of the penetrating hole 103. Since the diameter 106A of the anode electrode 106 is larger than the inner diameter of the first penetrating end 103A, for example, misalignment with the first penetrating end 103A can be suppressed when the anode electrode 106 is formed. The diameter 106A of the anode electrode 106 may be 100 μm or less.

The anode patterned electrode 108 is disposed on the second surface 102B side of the insulation member 102. The anode patterned electrode 108 is connected to the anode through electrode 112 on the second surface 102B side of the insulation member 102. The anode patterned electrode 108 connects the neighboring anode through electrode 112 and is connected to the lead wiring 124 via the interlayer connection part 126. The width of the anode patterned electrode 108 may be larger than the width of the second penetrating end 103B. Here, the width of the anode pattern electrode 108 shows a width perpendicular to the direction in which the anode pattern electrode 108 extends.

As described above, according to the radiation detection device including the detection element according to the present embodiment, even when a large amount of radiation is irradiated and silicon is converted into phosphorus by using glass as the insulation member 102, the insulating property can be maintained by oxygen-mediated bonding, and a high gas amplification factor can be stably obtained. By using glass in the insulation member 102, the concavo-convex structure of the inner surface of the penetrating hole 103 penetrating the insulation member 102 can be suppressed, and the aspect ratio of the penetrating hole 103 can be formed in the range of 4 or more and 8 or less. By using insulation material as the substrate, problems of parasitic capacity due to the oxide layer or the like can be suppressed when the silicon base material having the oxide layer formed on its surface is used. In addition, the absence of the insulating resin layer can prevent the generation of gas from the resin materials in the chamber in which the gas is sealed. Therefore, the frequency of replacing the reactant gases in the radiation detection device 100 can be reduced.

[Production Method for Detection Element]

Referring to FIGS. 5A to 7B, a production method for the radiation detection element 10 according to the present embodiment will be described. In FIGS. 5A to 7B, the same elements as those shown in FIGS. 3 and 4A to 4C are given by the same reference numerals.

Figure 5A:
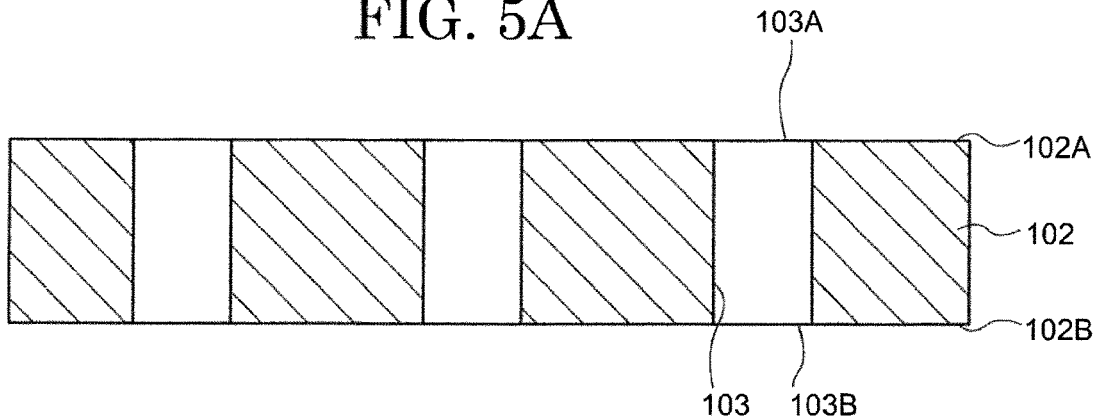
FIGS. 5A to 5D area diagram showing a process for manufacturing a detection element according to an embodiment of the present disclosure.

FIG. 5A is a diagram showing a process of forming the penetrating hole 103 on the insulation member 102 in a production method for the radiation detection element according to an embodiment of the present disclosure. As a method of forming the penetrating hole 103 in the insulation member 102, a method such as wet etching or dry etching using photolithography, sublimation or ablation by laser irradiation, alteration layer forming and wet etching by laser irradiation, sandblasting method or the like can be used.

Figure 5B:
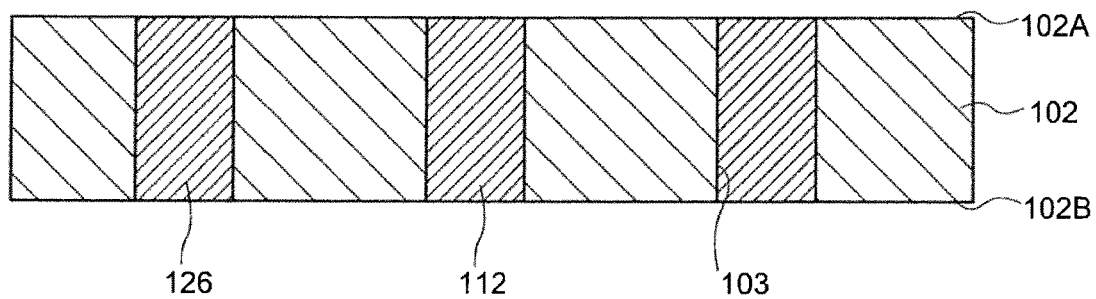

FIG. 5B is a diagram showing a process of filling the penetrating holes 103 with the anode through electrode 112 and the interlayer connection part 126 in the production method for the radiation detection element according to the embodiment of the present disclosure. The penetrating holes 103 are filled with the anode through electrode 112 and the interlayer connection part 126 as shown in FIG. 5B. The anode through electrode 112 and the interlayer connection part 126 can be filled by the electrolytic plating method or non-electrolytic plating method. Although not described in detail, a seed layer is formed on the first penetrating end 103A or the second penetrating end 103B of the penetrating hole 103, and a plating layer is grown on the seed layer until the penetrating hole 103 is closed to form so-called lid plating. Then, the anode through electrode 112 and the interlayer connection part 126 can be formed to fill the penetrating hole 103 by growing the plating layer from the lid plating toward the other penetrating end of the penetrating hole 103.

Figure 5C:
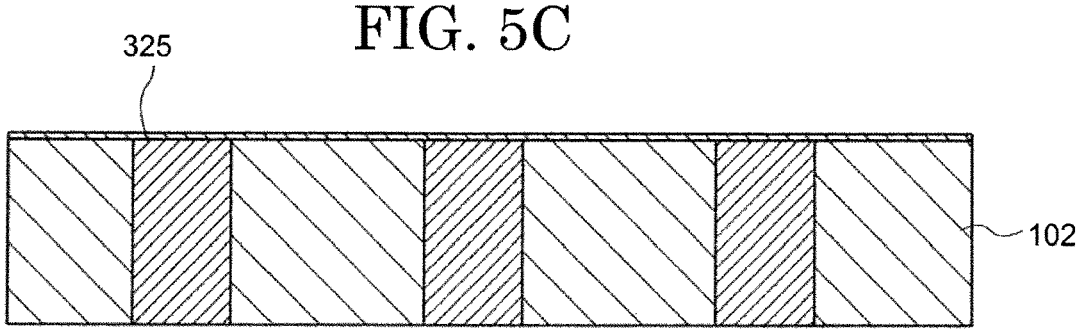

FIG. 5C is a diagram showing a process of forming a conductive layer 325 on the first surface of the insulation member 102 in the production method for the radiation detection element according to the embodiment of the present disclosure. As shown in FIG. 5C, on the first side of the insulation member 102, the conductive layer 325 is formed on the insulation member 102 and on the anode through electrode 112. The conductive layer 325 later becomes a part of the cathode electrode 104, the anode electrode 106, and the lead wiring 124. The conductive layer 325 can be formed by the PVD method, the CVD method, or the like. The material used for the conductive layer 325 may be selected from the same material as the plating layer 326 that will later be formed on the conductive layer 325. The conductive layer 325 is used as a seed in the electrolytic plating method when forming the plating layer 326 in a later process. Here, the conductive layer 325 is preferably formed with a thickness of 20 nm or more and 1 μm or less. The conductive layer 325 is more preferably formed with a thickness of 100 nm to 300 nm inclusive.

Figure 5D:
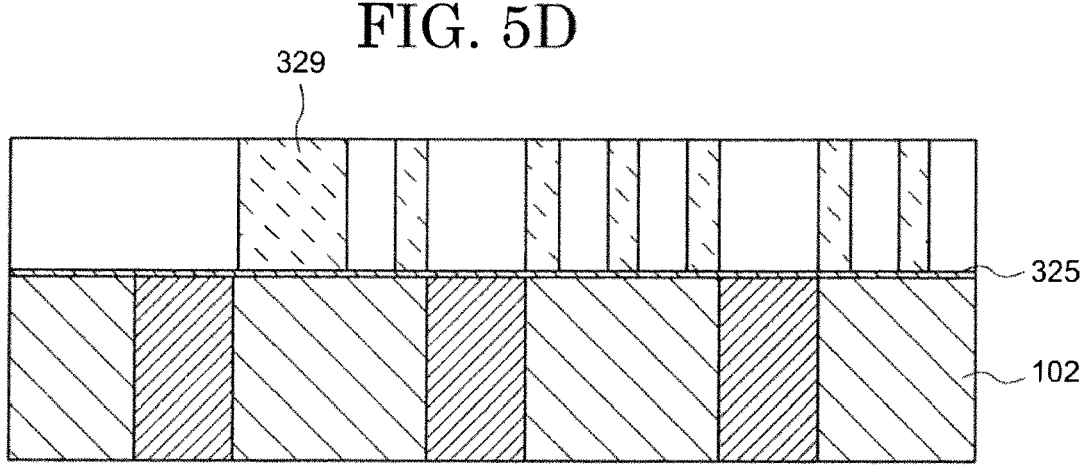

FIG. 5D is a diagram showing a process of forming a resist pattern 329 on the conductive layer 325 in the production method for the radiation detection element according to the embodiment of the present disclosure. As shown in FIG. 5D, after applying the photoresist on the conductive layer 325, a resist pattern 329 is formed by performing exposure and development. Here, the resist pattern 329 exposes a region that the cathode electrode 104, the anode electrode 106, and the lead wiring 124 will be formed later.

Figure 6A:
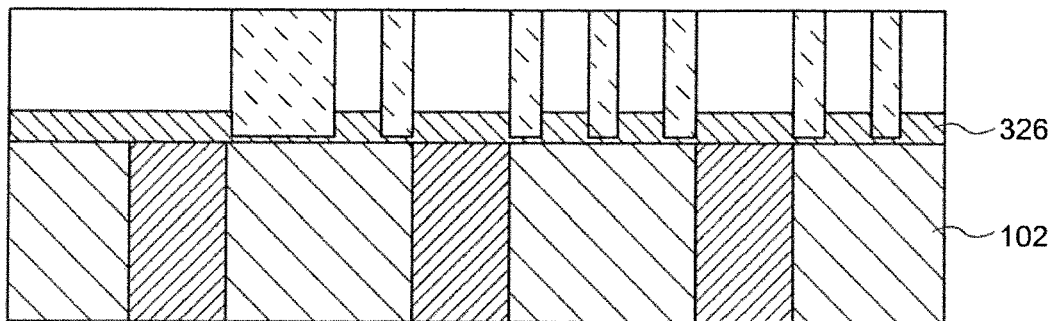
FIGS. 6A to 6D are a diagram showing a process for manufacturing a detection element according to an embodiment of the present disclosure.

FIG. 6A is a diagram showing a process of forming the plating layers 326 on the conductive layer 325 exposed from the resist in the production method for the radiation detection element according to the embodiment of the present disclosure. As shown in FIG. 6A, the plating layer 326 is formed in the regions where the patterns of the cathode electrode 104, the anode electrode 106, and the lead wiring 124 shown in FIG. 4A are formed. The electrolytic plating method is performed by energizing the conductive layer 325 to form the plating layer 326 on the conductive layer 325 which is exposed from the resist pattern 329.

Figure 6B:
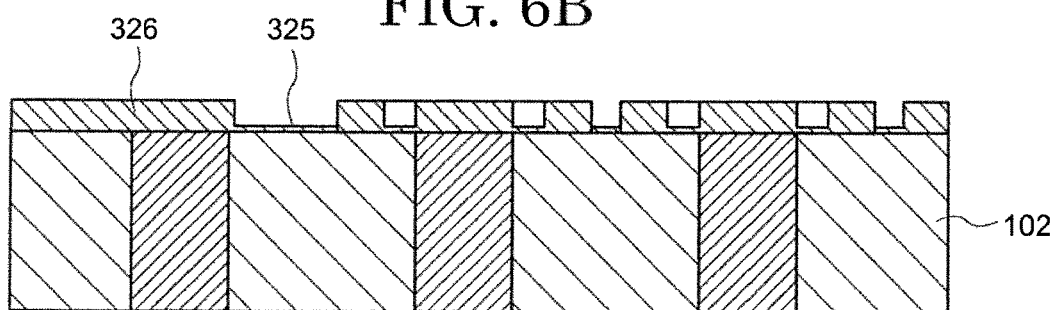

FIG. 6B is a diagram showing a process of removing the resist pattern 329 in the production method for the radiation detection element according to the embodiment of the present disclosure. As shown in FIG. 6B, after forming the plating layer 326, the photoresist constituting the resist pattern 329 is removed by the organic solvent. Instead of using the organic solvent, the oxygen-plasma ashing can also be used to remove the photoresist.

Figure 6C:
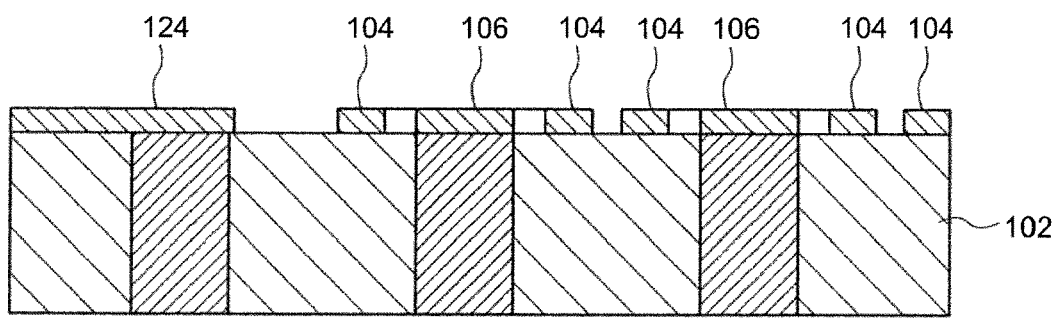

FIG. 6C is a diagram showing a process of forming the anode electrode and the cathode electrode in the production method for the radiation detection element according to the embodiment of the present disclosure. As shown in FIG. 6C, the cathode electrode 104, the anode electrode 106, and the lead wiring 124 electrically isolated by removing (etching) the conductive layer 325 of a region where the plating layer 326 is not formed on the top because it was covered by the resist pattern 329. Since the surface of the plating layer 326 is also etched to thin film by the etching of the conductive layer 325, it is preferable to set the film thickness of the plating layer 326 in consideration of the influence of this thinning. As the etching of conductive layer 325, the wet etching or dry etching can be used. Through this process, the cathode 104, the anode electrode 106, and the lead wiring 124 shown in FIG. 4A can be formed. The cathode electrode 104, the anode electrode 106, and the lead wiring 124 are formed from the conductive layer 325 and the plating layer 326, the structure formed integrally is shown in the figure.

Figure 6D:
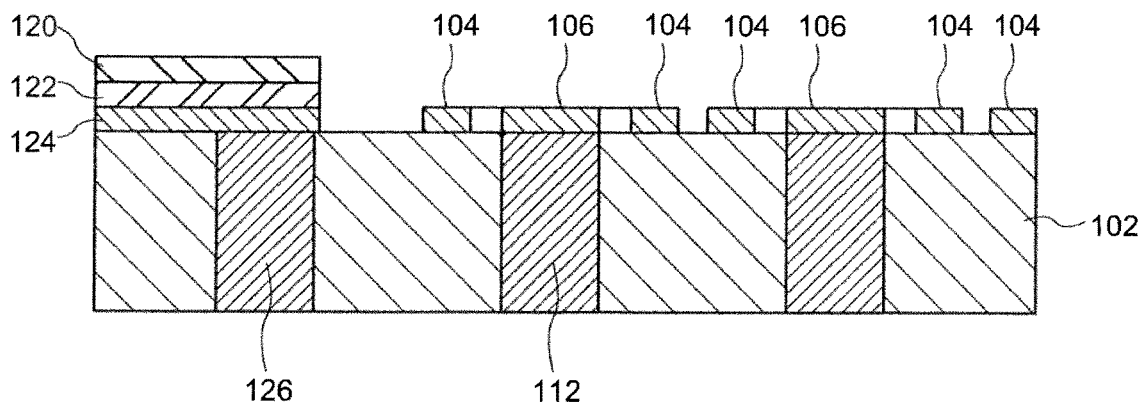

FIG. 6D is a diagram showing a process of forming a wiring terminal in the production method for the radiation detection element according to the embodiment of the present disclosure. As shown in FIG. 6D, the connecting terminal part may be formed by further forming the second metal layer 122 and the first metal layer 120 on the lead wiring 124. The second metal layer 122 and the first metal layer 120 may be selectively formed on the lead wiring 124 by an electrolytic plating method that energizes the lead wiring 124. However, the second metal layer 122 and the first metal layer 120 may be formed by depositing a metal layer to form the second metal layer 122 and the first metal layer 120 on the entire surface, covering the region corresponding to the connecting terminal region with a photoresist, and etching the other region.

Figure 7A:
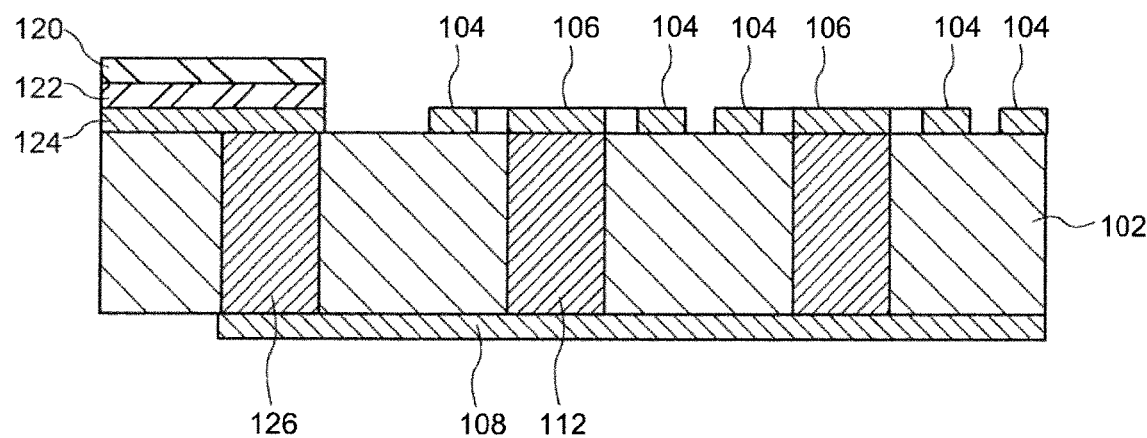
FIGS. 7A to 7B are a diagram showing a process for manufacturing a detection element according to an embodiment of the present disclosure.

FIG. 7A is a diagram showing a process of forming the anode pattern electrodes 108 on a back surface of the substrate in the production method for the radiation detection element according to the embodiment of the present disclosure. As shown in FIG. 7A, to form the anode patterned electrode 108 on the second surface side of the insulation member 102. By the above-described production methods, the structures of the radiation detection element 10 shown in FIGS. 3 and 4A can be obtained.

Figure 7B:
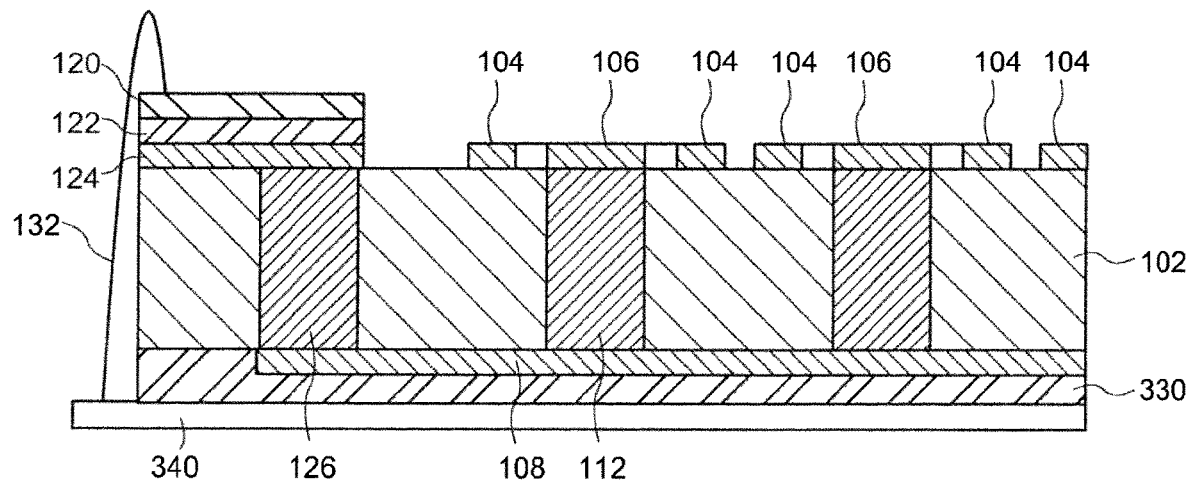

FIG. 7B is a diagram showing a wire bonding process in the production method for the radiation detection element according to the embodiment of the present disclosure. As shown in FIG. 7B, the detection element of FIG. 7A may be mounted to the frame 340 via the adhesive layer 330, and the first metallic layer 120 and the frame 340 may be connected to each other by the bonding wire 132.

Second Embodiment

A radiation detection element 10a according to the present embodiment is the same as the radiation detection element 10 according to the first embodiment except that a penetrating hole 103a and an anode through electrode 112a are cone-shaped. Here, portions different from those of the radiation detection element 10 according to the first embodiment will be described. In the radiation detection element 10a according to the second embodiment, the same numerals are given to the same portions or portions having the same functions as those of the radiation detection element 10 shown in FIGS. 3 and 4A to 4C, and repeated descriptions thereof are omitted.

[Configuration of the Pixel Electrode]

Figure 8:
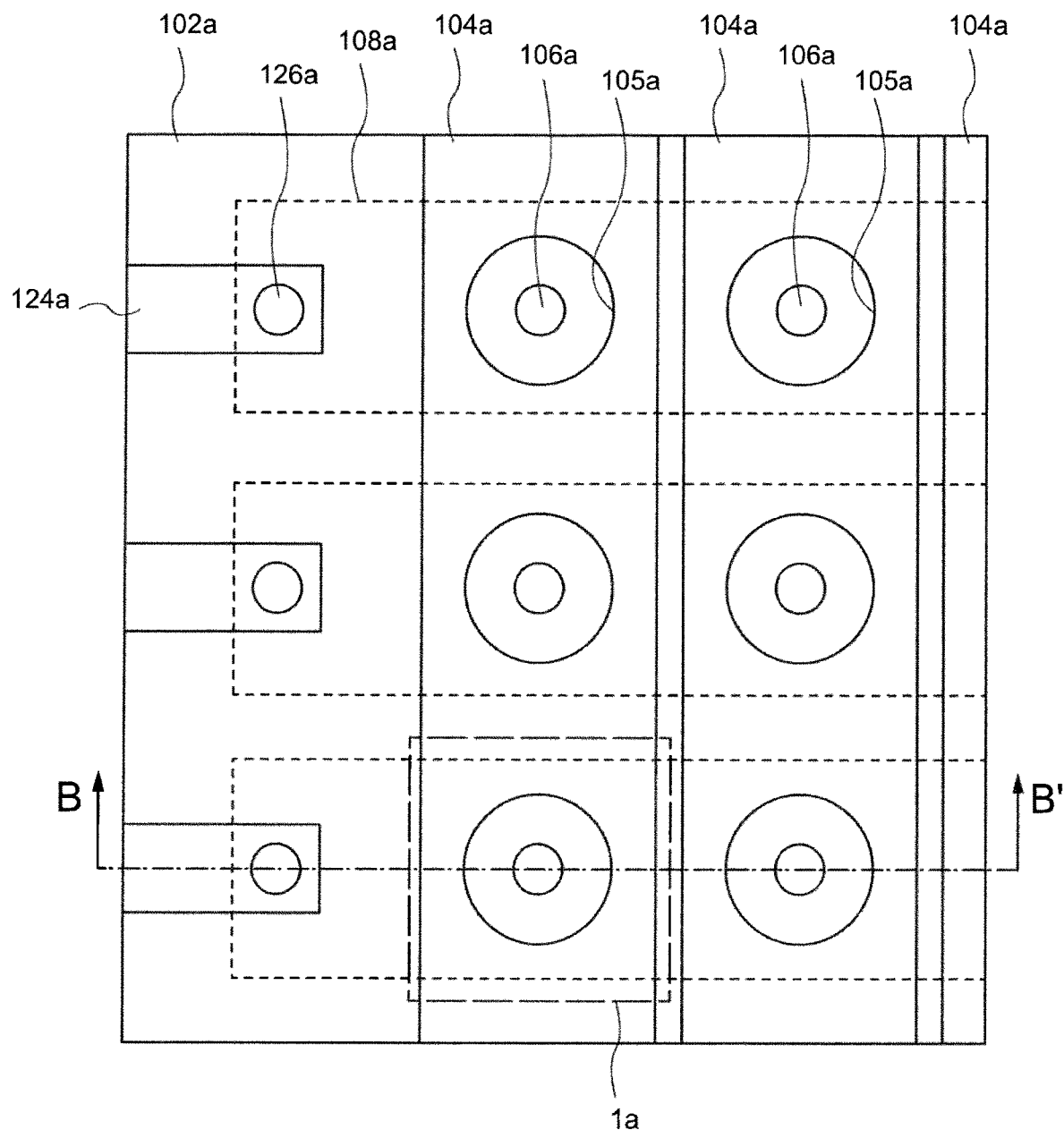
FIG. 8 is a plan view of a portion of a detection element according to an embodiment of the present disclosure.
Figure 9A:
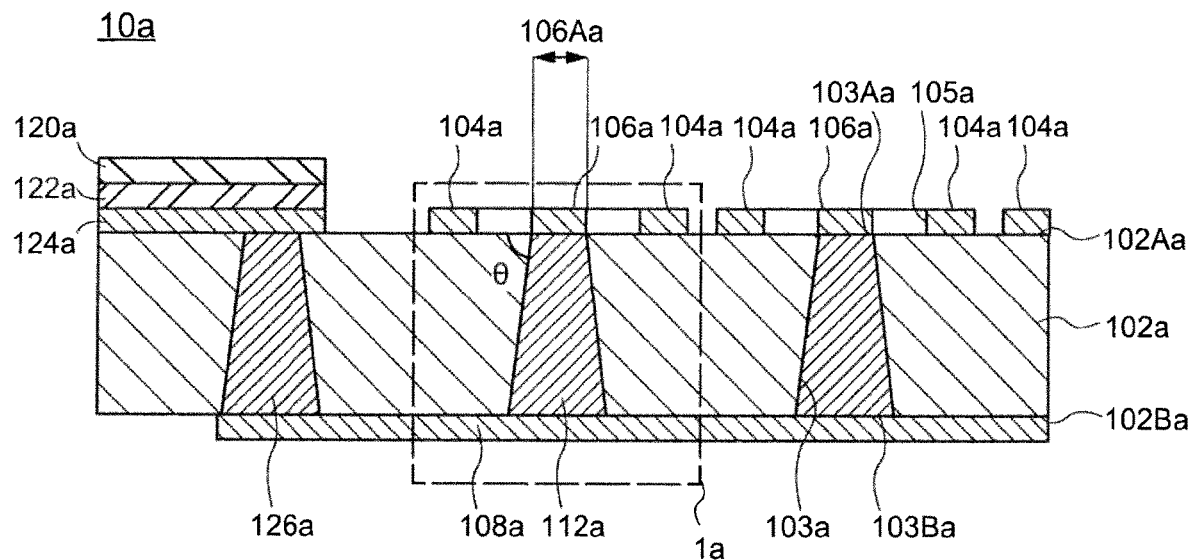
FIGS. 9A to 9C are a cross-sectional view of a portion of a detection element according to an embodiment of the present disclosure.

Referring to FIGS. 8 and 9A to 9C, the configuration of the pixel electrode included in the radiation detection element according to the second embodiment of the present disclosure will be described in detail. FIG. 8 is a plan view of a portion of the radiation detection element 10a according to the embodiment of the present disclosure. FIG. 9A is a cross-sectional view of a portion of the radiation detection element 10a according to the embodiment of the present disclosure. FIG. 9A is a B-B' cross-sectional view of FIG. 8.

As shown in FIG. 8 and FIG. 9A, a pixel electrode 1a of the radiation detection element 10a has an insulation member 102a, anode electrode 106a (first electrode), anode through electrode 112a, anode pattern electrode 108a, and cathode electrode 104a (second electrode). The anode electrode 106a is connected to the anode through electrode 112a disposed in the penetrating hole 103a on a first surface 102Aa side of the insulation member 102a. The anode through electrode 112a is filled in the penetrating hole 103a.

The penetrating hole 103a connects from the first surface 102Aa to a second surface 102Ba of the insulation member 102a. In this embodiment, the penetrating hole 103a is cone-shaped. That is, the penetrating hole 103a has different inner diameters at two different positions along the thickness direction of the insulation member 102a. A first penetrating end 103Aa on the first surface 102Aa side of the penetrating hole 103a and a second penetrating end 103Ba on the second surface 102Ba side of the penetrating hole 103a have different inner diameters. In the penetrating hole 103a, the inner diameter of the first penetrating end 103Aa on the first surface 102Aa side is smaller than the inner diameter of the second penetrating end 103Ba on the second surface 102Ba side.

Here, an angle θ formed by the first surface 102Aa of the insulation member 102a and the sidewall of the penetrating hole 103a is in a range of 85° or more and 89° or less. Here, the angle θ to be formed is preferably 86° or more and 88° or less. The angle θ to be formed is more preferably 86.5° or more and 87.5° or less. In other words, the penetrating hole 103a according to the present embodiment has a tapered shape in which the diameter increases from the first surface 102Aa toward the second surface 102Ba of the insulation member 102a.

The aspect ratio of the penetrating hole 103a is preferably in the range of 4 or more and 8 or less. If the aspect ratio of the penetrating hole 103a is larger than 8, it becomes difficult to form a conductive layer over the entire depth of the penetrating hole 103a on the inner surface of the penetrating hole 103a when forming the anode through electrode 112a to be described later. If the aspect ratio of the penetrating hole 103a is less than 4, it becomes difficult to form a fine pixel electrode 1a on the radiation detection element 10a when the thickness of the insulation member 102a is maintained at a constant or more.

Figure 9B:
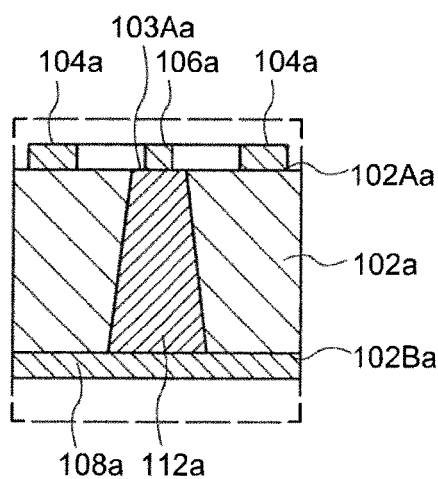
Figure 9C:
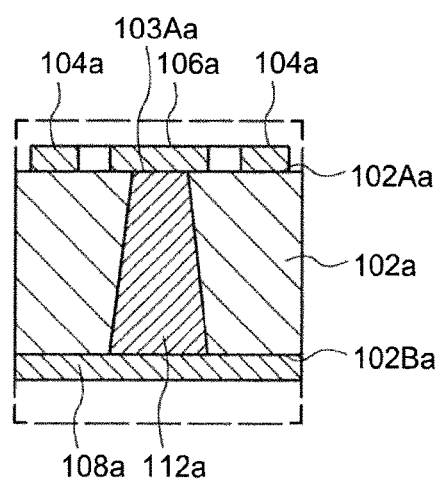

In the present embodiment, the inner diameter of the first penetrating end 103Aa on the first surface 102Aa side of the penetrating hole 103a is substantially the same as a diameter 106Aa of the anode electrode 106a. However, the present invention is not limited to this. FIGS. 9B and 9C are cross-sectional view of a portion of the detection element according to the modified example of the present embodiment. As shown in FIG. 9B, the diameter 106Aa of the anode electrode 106a may be smaller than the inner diameter of the first penetrating end 103 Aa on the first surface 102Aa side of the penetrating hole 103a. As shown in FIG. 9C, the diameter 106Aa of the anode electrode 106a may be larger than the inner diameter of the first penetrating end 103Aa on the first surface 102Aa side of the penetrating hole 103a. Since the diameter 106Aa of the anode electrode 106a is larger than the inner diameter of the first penetrating end 103Aa, for example, misalignment with the first penetrating end 103Aa can be suppressed when the anode electrode 106a is formed. The diameter 106Aa of the anode electrode 106a may be 100 μm or less.

The anode pattern electrode 108a is connected to the anode through electrode 112a on the second surface 102Ba of the insulation member 102a. The width of the anode pattern electrode 108a may be larger than the width of the second penetrating end 103Ba.

As described above, according to the radiation detection device including the detection element according to the present embodiment, even when a large amount of radiation is irradiated and silicon is converted into phosphorus by using glass as the insulation member 102a, the insulating property can be maintained by oxygen-mediated bonding, and a high gas amplification factor can be stably obtained. By using glasses for the insulation member 102a, the concavo-convex structures on the inner surface of the penetrating hole 103a penetrating the insulation member 102a can be suppress, and the aspect ratio of the penetrating hole 103a can be formed in the range of 4 or more and 8 or less. By using insulation material as the substrate, problems of parasitic capacity due to the oxide layer or the like can be suppressed when the silicon base material having the oxide layer formed on its surface is used. In addition, the absence of the insulating resin layer can prevent the generation of gas from the resin materials in the chamber in which the gas is sealed. Therefore, the frequency of replacing the reactant gases in the radiation detection device 100a can be reduced. Since the first penetrating end 103Aa of the penetrating hole 103a is smaller than the second penetrating end 103Ba in the radiation detection element 10a according to the present embodiment, the diameter 106Aa of the anode electrode 106a can be reduced, and a higher gas amplification factor can be obtained. Since the first penetrating end 103Aa of the penetrating hole 103a is smaller than the second penetrating end 103Ba, the distance between the first penetrating end 103Aa and the cathode 104a can be increased, and the electric field between the cathode 104a and the anode electrode 106a can be stabilize.

[Production Method for Detection Element]

The production method for the detection element according to the present embodiment is the same as the production method for the detection element according to the first embodiment except that the penetrating hole 103a is formed from the second surface 102Ba of the insulation member 102a by laser-irradiation, and therefore, the description thereof is omitted here. By forming the penetrating hole 103a from the second surface 102Ba of the insulation member 102a by laser radiation, the second penetrating end 103Ba on the second surface 102Ba side of the insulation member 102a close to the laser is formed to be larger than the first penetrating end 103Aa. The penetrating hole 103a is formed in a tapered shape in which an angle θ formed by the second surface 102Ba of the insulation member 102a and the side wall of the penetrating hole 103a is 91° or more and 95° or less.

Third Embodiment

A radiation detection element 10b according to the present embodiment is the same as the radiation detection element 10a according to the second embodiment except that the sizes of a first penetrating end 103Ab and a second penetrating end 103 Bb of a penetrating hole 103b are switched. Here, portions different from those of the radiation detection element 10 according to the first embodiment and the radiation detection element 10a according to the second embodiment will be described. In the radiation detection element 10b according to the third embodiment, the same numerals are given to the same portions or portions having the same functions as those of the radiation detection element 10 shown in FIGS. 3 and 4A to 4C, and repeated descriptions thereof are omitted.

[Configuration of the Pixel Electrode]

Figure 10:
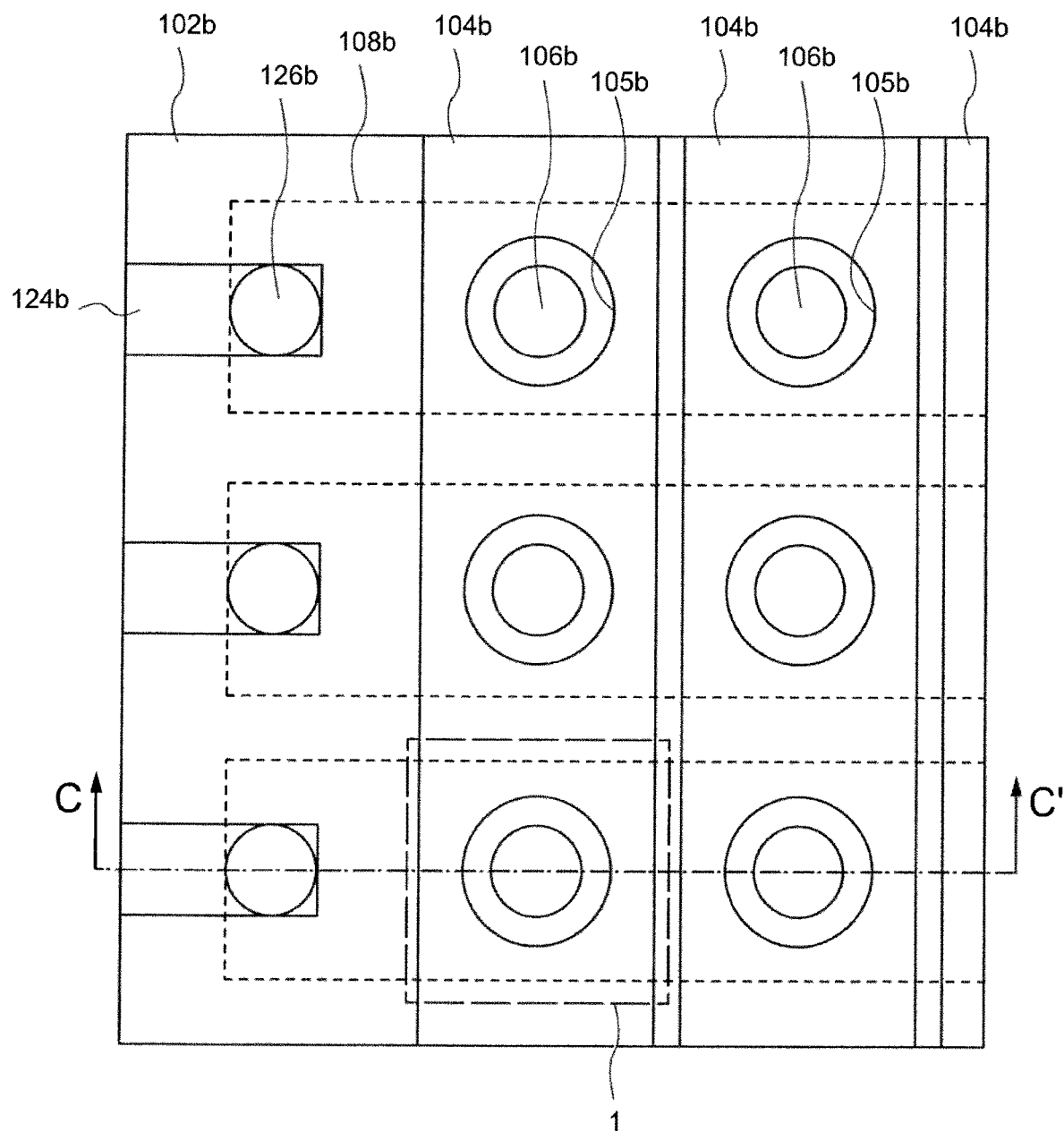
FIG. 10 is a plan view of a portion of a detection element according to an embodiment of the present disclosure.
Figure 11A:
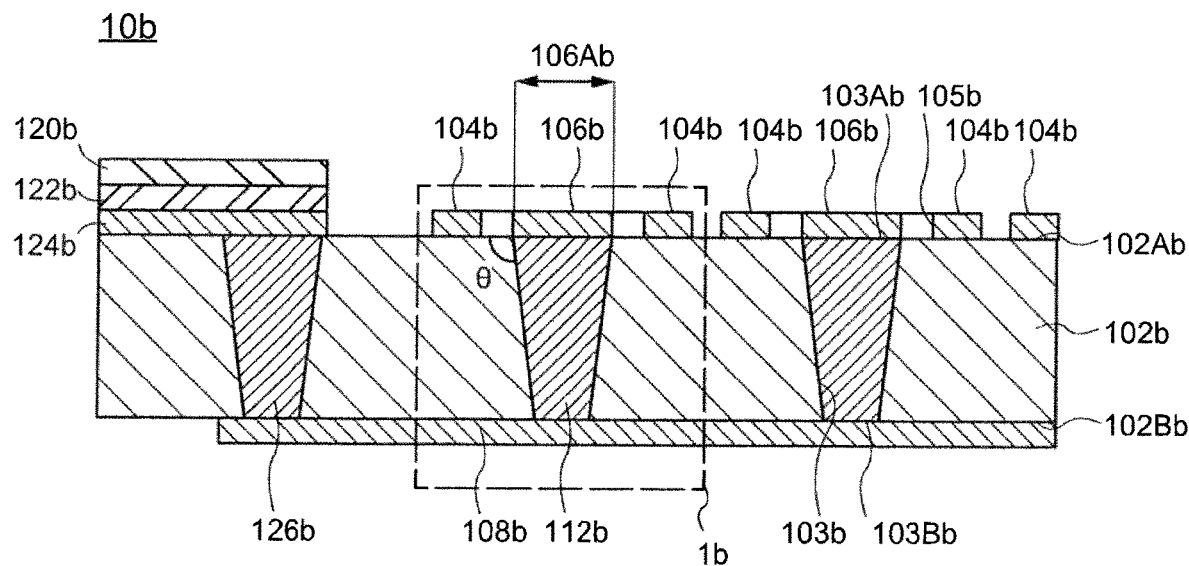
FIGS. 11A to 11C are a cross-sectional view of a portion of a detection element according to an embodiment of the present disclosure.

Referring to FIGS. 10 and 11A to 11C, the configuration of the pixel electrode included in the radiation detection element according to the third embodiment of the present disclosure will be described in detail. FIG. 10 is a plan view of a portion of the radiation detection element 10b according to the embodiment of the present disclosure. FIG. 11A is a cross-sectional view of a portion of the radiation detection element 10b according to the embodiment of the present disclosure. FIG. 11A is a C-C' cross-sectional view of FIG. 10.

As shown in FIGS. 10 and 11A, a pixel electrode 1b of the radiation detection element 10b has an insulation member 102b, anode electrode 106b (first electrode), anode through electrode 112b, anode pattern electrode 108b, and cathode electrode 104b (second electrode). The anode electrode 106b is connected to the anode through electrode 112b disposed in the penetrating hole 103b on a first surface 102Ab side of the insulation member 102b. The anode through electrode 112b is filled in the penetrating hole 103b.

The penetrating hole 103b connects from the first surface 102Ab to a second surface 102Bb of the insulation member 102b. In this embodiment, the penetrating hole 103b is cone-shaped. That is, the penetrating hole 103b has different inner diameters at two different positions along the thickness direction of the insulation member 102b. A first penetrating end 103Ab on the first surface 102Ab side of the penetrating hole 103b and a second penetrating end 103Bb on the second surface 102Bb side of the penetrating hole 103b have different inner diameters. In the penetrating hole 103b, the inner diameter of the second penetrating end 103Bb on the second surface 102Bb side is smaller than the inner diameter of the first penetrating end 103Ab on the first surface 102Ab side.

Here, an angle θ formed by the first surface 102Ab of the insulation member 102b and the sidewall of the penetrating hole 103b is in a range of 91° or more and 95° or less. Here, the angle θ to be formed is preferably 92° or more and 94° or less. The angle θ to be formed is more preferably 92.5° or more and 93.5° or less. In other words, the penetrating hole 103b according to the present embodiment has a tapered shape in which the diameter increases from the second surface 102Bb toward the first surface 102Ab of the insulation member 102b.

The aspect ratio of the penetrating hole 103b is preferably in the range of 4 or more and 8 or less. If the aspect ratio of the penetrating hole 103b is larger than 8, it becomes difficult to form a conductive layer over the entire depth of the penetrating hole 103b on the inner surface of the penetrating hole 103b when forming the anode through electrode 112b to be described later. If the aspect ratio of the penetrating hole 103b is less than 4, it becomes difficult to form a fine pixel electrode 1b on the radiation detection element 10b when the thickness of the insulation member 102b is maintained at a constant or more.

Figure 11B:
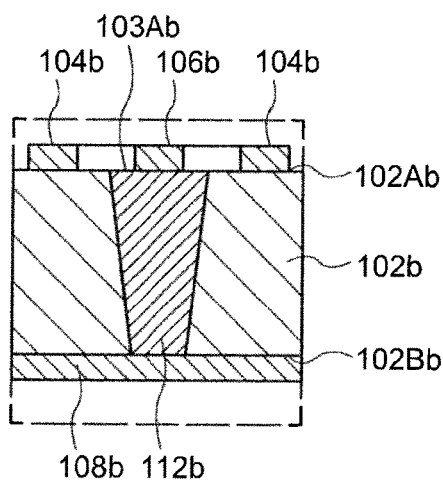
Figure 11C:
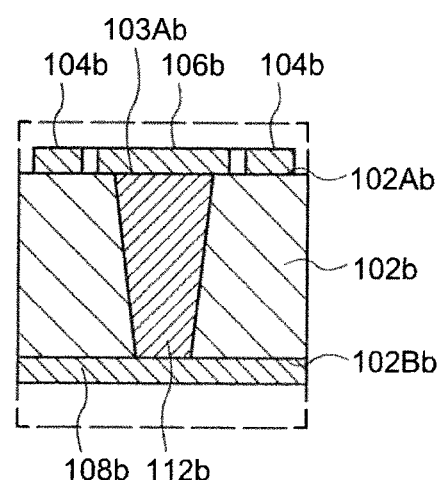

In the present embodiment, the inner diameter of the first penetrating end 103Ab on the first surface 102Ab of the penetrating hole 103b is substantially the same as a diameter 106Ab of the anode electrode 106b. However, the present invention is not limited to this. FIGS. 11B and 11C are cross-sectional view of a portion of the detection element according to the modified example of the present embodiment. As shown in FIG. 11B, the diameter 106Ab of the anode electrode 106b may be smaller than the inner diameter of the first penetrating end 103 Ab on the first surface 102Ab side of the penetrating hole 103b. As shown in FIG. 11C, the diameter 106Ab of the anode electrode 106b may be larger than the inner diameter of the first penetrating end 103Ab on the first surface 102Ab side of the penetrating hole 103b. Since the diameter 106Ab of the anode electrode 106b is larger than the inner diameter of the first penetrating end 103Ab, for example, misalignment with the first penetrating end 103Ab can be suppressed when the anode electrode 106b is formed. The diameter 106Ab of the anode electrode 106 b may be 100 μm or less.

Anode pattern electrode 108b is connected to the anode through electrode 112b on the second surface 102Bb side of the insulation member 102b. The width of the anode patterned electrode 108b may be larger than the width of the second penetrating end 103Bb.

As described above, according to the radiation detection device including the detection element according to the present embodiment, even when a large amount of radiation is irradiated and silicon is converted into phosphorus by using glass as the insulation member 102b, the insulating property can be maintained by oxygen-mediated bonding, and a high gas amplification factor can be stably obtained. By using glasses for the insulation member 102b, concavo-convex structures on the inner surface of the penetrating hole 103b penetrating the insulation member 102b can be suppress, the aspect ratio of the penetrating hole 103b can be formed in the range of 4 or more and 8 or less. By using insulation material as the substrate, problems of parasitic capacity due to the oxide layer or the like can be suppressed when the silicon base material having the oxide layer formed on its surface is used. In addition, the absence of the insulating resin layer can prevents the generation of gas from the resin materials in the chamber in which the gas is sealed. Therefore, the frequency of replacing the reactant gases in the radiation detection device 100b can be reduced. Since the second penetrating end 103Bb of the penetrating hole 103b is smaller than the first penetrating end 103Ab, the widths of the anode pattern electrodes 108b can be reduced, and a fine wiring pattern can be formed in the radiation detection element 10b according to the present embodiment.

[Production Method for Detection Element]

The production method for the detection element according to the present embodiment is the same as the production method for the detection element according to the first embodiment except that the penetrating hole 103b is formed from the first surface 102Ab of the insulation member 102b by laser-irradiation, and therefore, the description thereof is omitted here. By forming the penetrating hole 103b by laser radiation from the first surface 102Ab of the insulation member 102b, the first penetrating end 103Ab on the first surface 102Ab side of the insulation member 102b close to the laser is formed to be larger than the second penetrating end 103Bb. The penetrating hole 103b is formed in a tapered shape in which an angle θ formed by the first surface 102Ab of the insulation member 102b and the sidewall of the penetrating hole 103b is 91° or more and 95° or less.

Fourth Embodiment

A radiation detection element 10c according to the present embodiment is the same as the radiation detection element 10 according to the first embodiment except that the penetrating hole 103c is a combination of the second penetrating end 103Ba side of the penetrating hole 103a according to the second embodiment and the first penetrating end 103Ab side of the penetrating hole 103b according to the third embodiment. Here, portions different from those of the radiation detection element 10 according to the first embodiment, the radiation detection element 10a according to the second embodiment, and radiation detection element 10b according to the third embodiment will be described. In the radiation detection element 10c according to the fourth embodiment, the same numerals are given to the same portions or portions having the same functions as those of the radiation detection element 10 shown in FIGS. 3 and 4A to 4C, and repeated descriptions thereof are omitted.

[Configuration of the Pixel Electrode]

Figure 12:
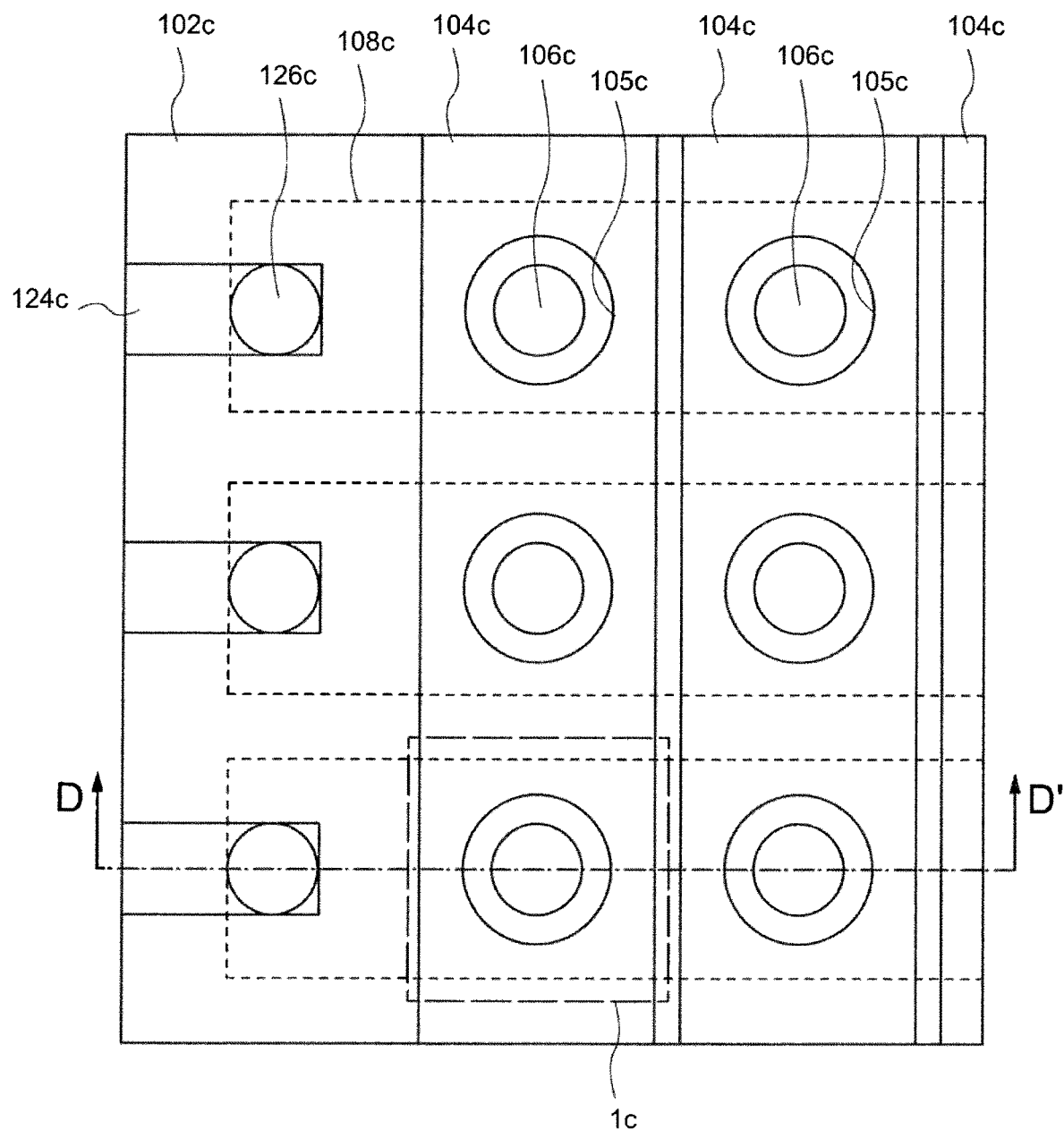
FIG. 12 is a plan view of a portion of a detection element according to an embodiment of the present disclosure.
Figure 13A:
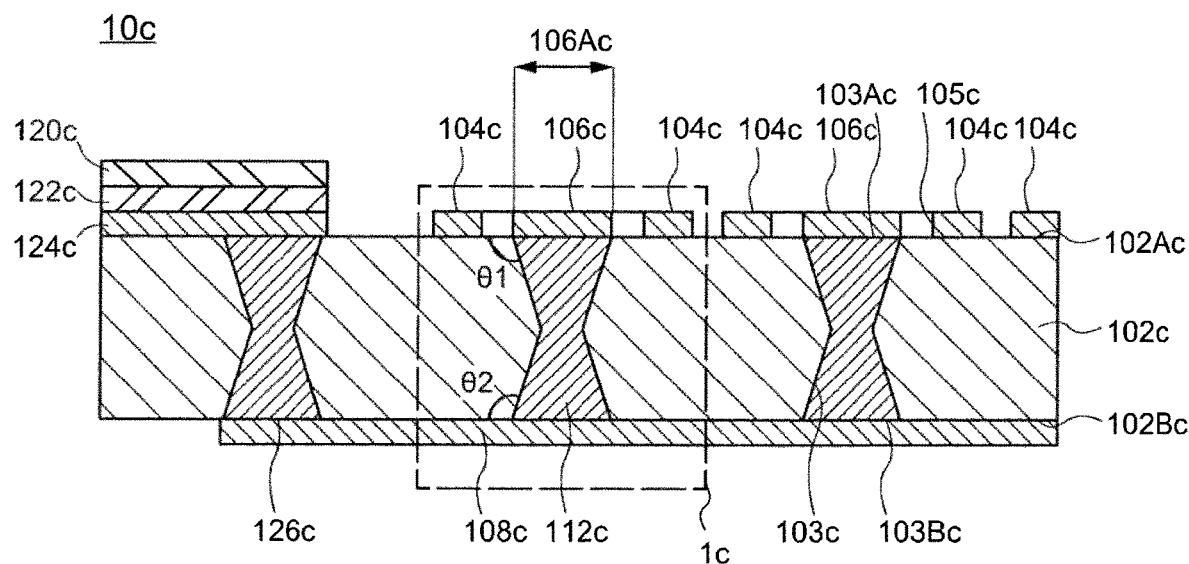
FIGS. 13A to 13C are a cross-sectional view of a portion of a detection element according to an embodiment of the present disclosure.

Referring to FIGS. 12 and 13 A to 13C, the configuration of the pixel electrode included in the radiation detection element according to the fourth embodiment of the present disclosure will be described in detail. FIG. 12 is a plan view of a portion of the radiation detection element 10c according to an embodiment of the present disclosure. FIG. 13A is a cross-sectional view of a portion of the radiation detection element 10c according to an embodiment of the present disclosure. FIG. 13A is a D-D' cross-sectional view of FIG. 12.

As shown in FIGS. 12 and 13A, a pixel electrode 1c of the radiation detection element 10c has an insulation member 102c, anode electrode 106c (first electrode), anode through electrode 112c, anode pattern electrode 108c, and cathode electrode 104c (second electrode). The anode electrode 106c is connected to the anode through electrode 112c disposed in the penetrating hole 103c on a first surface 102Ac side of the insulation member 102c. The anode through electrode 112c is filled in the penetrating hole 103c.

The penetrating hole 103c connects from the first surface 102Ac to a second surface 102Bc of the insulation member 102c. In this embodiment, the penetrating hole 103c is bidirectional cone-shaped. The penetrating hole 103c is shaped combining the ends of the second penetrating end 103Ba side of the penetrating hole 103a according to the second embodiment and the first penetrating end 103Ab side of the penetrating hole 103b according to the third embodiment (end to end with a larger inner diameter). The penetrating hole 103c has different inner diameters at two different portions along the thickness direction of the insulation member 102c. The penetrating hole 103c has an inner diameter smaller than the inner diameter of a first penetrating end 103Ac and the inner diameter of a second penetrating end 103Bc along the thickness direction of the insulation member 102c. In this embodiment, the narrowed portion having the smallest inner diameter of the penetrating hole 103c is located at the center of the first penetrating end 103Ac and the second penetrating end 103Bc. The first penetrating end 103Ac on the first surface 102Ac side of the penetrating hole 103c and the second penetrating end 103Bc on the second surface 102Bc side of the penetrating hole 103c have substantially the same inner diameter. However, the present invention is not limited to this, and the narrowed portion of the penetrating hole 103c may be between the first penetrating end 103Ac and the second penetrating end 103Bc. The first penetrating end 103Ac and the second penetrating end 103Bc may have different inner diameter.

Here, an angle θ1 formed by the first surface 102Ac of the insulation member 102c and the sidewall of the penetrating hole 103c and an angle θ2 formed by the second surface 102Bc and the side surface of the penetrating hole 103c are in the range of 92° or more and 97° or less, respectively. Here, the angle θ1 and θ2 to be formed may be preferably 93° or more and 95° or less. The angles θ1 and θ2 to be formed are more preferably 93.5° or more and 94.5° or less. The angles θ1 and θ2 may be substantially the same or different.

The aspect ratio of the penetrating hole 103c is preferably in the range 4 or more and 8 or less. If the aspect ratio of the penetrating hole 103c is larger than 8, it becomes difficult to form a conductive layer over the entire depth of the penetrating hole 103c on the inner surface of the penetrating hole 103c when forming the anode through electrode 112c to be described later. If the aspect ratio of the penetrating hole 103c is less than 4, it becomes difficult to form a fine pixel electrode 1c on the radiation detection element 10c when the thickness of the insulation member 102c is maintained at a constant or more.

Figure 13B:
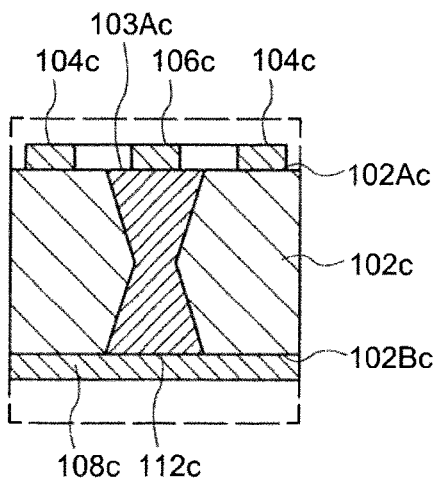
Figure 13C:
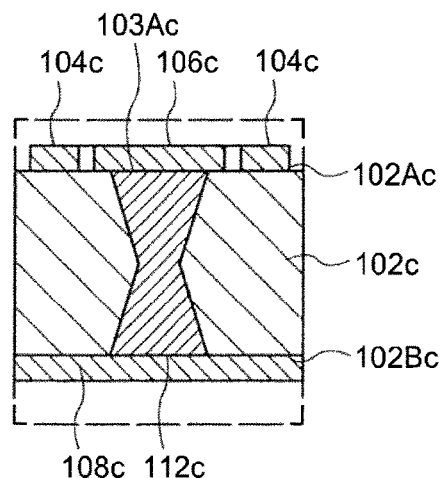

In the present embodiment, the inner diameter of the first penetrating end 103Ac on the first surface 102Ac of the penetrating hole 103c is substantially the same as the diameter 106Ac of the anode electrode 106c. However, the present invention is not limited to this. FIGS. 13B and 13C are cross-sectional view of a portion of the detection element according to the modified example of the present embodiment. As shown in FIG. 13B, the diameter 106Ac of the anode electrode 106c may be smaller than the inner diameter of the first penetrating end 103Ac on the first surface 102Ac side of the penetrating hole 103c. As shown in FIG. 13C, the diameter 106Ac of the anode electrode 106c may be larger than the inner diameter of the first penetrating end 103Ac on the first surface 102Ac of the penetrating hole 103c. Since the diameter 106Ac of the anode electrode 106c is larger than the inner diameter of the first penetrating end 103 Ac, for example, misalignment with the first penetrating end 103Ac can be suppressed when the anode electrode 106c is formed. The diameter 106Ac of the anode electrode 106c may be 100 μm or less.

The anode pattern electrode 108c is connected to the anode through electrode 112c on the second surface 102Bc side of the insulation member 102c. The widths of the anode patterned electrodes 108c may be larger than the widths of the second penetrating end 103Bc.

As described above, according to the radiation detection device including the detection element according to the present embodiment, even when a large amount of radiation is irradiated and silicon is converted into phosphorus by using glass as the insulation member 102c, the insulating property can be maintained by oxygen-mediated bonding, and a high gas amplification factor can be stably obtained. By using glasses for the insulation member 102c, concavo-convex structures on the inner surface of the penetrating hole 103c penetrating the insulation member 102c can be suppress, the aspect ratio of the penetrating hole 103c can be formed in the range of 4 of more and 8 or less. By using insulation material as the substrate, problems of parasitic capacity due to the oxide layer or the like can be suppressed when the silicon base material having the oxide layer formed on its surface is used. In addition, the absence of an insulating resin layer can prevents the generation of gas from the resin materials in the chamber in which the gas is sealed. Therefore, the frequency of replacing the reactant gases in the radiation detection device 100c can be reduced. Since the first penetrating end 103Ac of the penetrating hole 103c of the radiation detection electrode 10c according to the present embodiment is smaller than the first penetrating end 103Ab of the radiation detection electrode 10b according to the third embodiment, the diameter 106Ac of the anode electrode 106c can be reduced, and a higher gas amplification factor can be obtained. Since the first penetrating end 103Ac is smaller than the first penetrating end 103Ab according to the third embodiment, the distances between the first penetrating end 103Ac and the cathode electrode 104c can be increased, and the electric field between the cathode electrode 104c and the anode electrode 106c can be further stabilized. Since the second penetrating end 103Bc of the penetrating hole 103c is smaller than the second penetrating end 103 Ba of the radiation detection electrode 10a according to the second embodiment, the widths of the anode pattern electrodes 108c can be reduced, and a fine wiring pattern can be formed.

[Production Method for Detection Element]

The production method for the detection element according to the present embodiment is the same as the production method for the detection element according to the first embodiment except that the penetrating hole 103c is formed from each of the first surface 102Ac and the second surface 102Bc of the insulation member 102c by laser-irradiation, therefore, the description thereof is omitted here. By forming the penetrating hole 103c by laser-irradiation from each of the first surface 102Ac and the second surface 102Bc of the insulation member 102c, the first penetrating end 103Ac on the first surface 102Ac side of the insulation member 102c and the second penetrating end 103Bc on the second surface 102Bc side are formed to be larger than the narrowed portion therebetween. The penetrating hole 103c is formed in a biconical frustum shape in which the angles θ between the first surface 102Ac and the second surface 102Bc of the insulation member 102c and the sidewalls of the penetrating hole 103c connected to the respective surfaces are not less than 92° and not more than 97°.

Fifth Embodiment

In this embodiment, another example of the radiation detection device of the present disclosure will be described. Since the configuration is the same as that of the first to fourth embodiments, the same configuration will not be described again. The radiation detection device is also called a container module.

Figure 14:
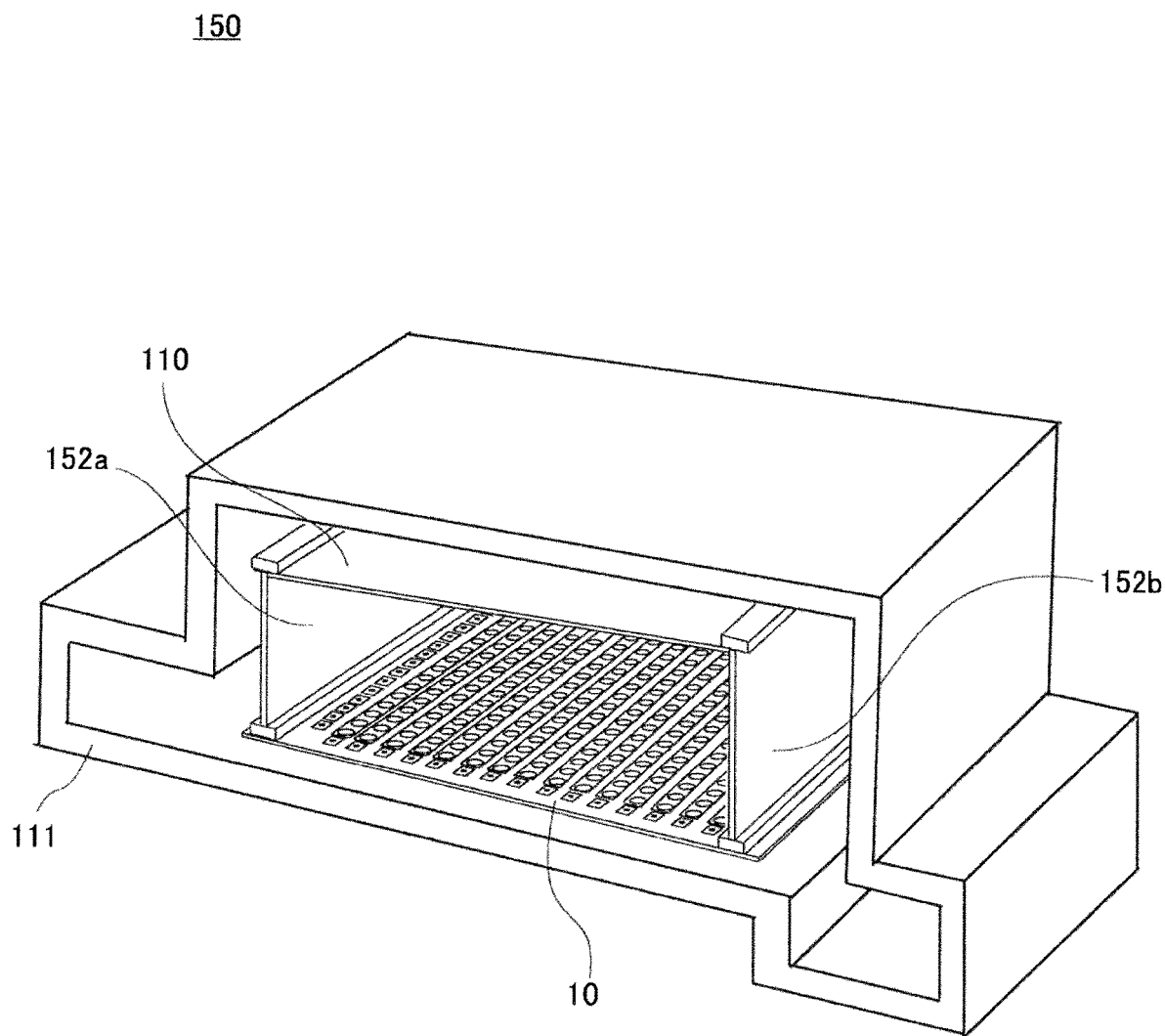
FIG. 14 is a cross-sectional perspective view of a radiation detection device (container module) according to an embodiment of the present disclosure.

FIG. 14 is a diagram showing cross-sectional perspective view of a radiation detection device 150 according to the embodiment of the present disclosure. The radiation detection device 150 according to the present embodiment includes the radiation detection element 10, the drift electrode 110, and the chamber 111. A drift cage 152a and 152b are arranged in the radiation detection device 150 according to the present embodiment. The drift cages 152a and 152b are arranged to equalize the electric field distribution between the drift electrode 110 and the pixel electrode portion 101. Here, the disclosed radiation detection device according to the present embodiment is referred to as the container module.

EXAMPLES

The radiation detection device having the detection element according to the embodiment of the present disclosure as described above will be described in more detail.

In order to improve the gas amplification factor and maintain the resolution of the radiation detection element according to the embodiment of the present disclosure, the structures of the detection element have been compared and examined.

Example 1

The radiation detection device 100 was manufactured using the radiation detection element 10 according to the first embodiment. The parameters of the detection element according to the first example are as follows.
Width of the cathode electrode: 350 μm
Opening diameter of the cathode electrode: 250 μm
Diameter of the anode electrode: 85 μm
Distance between the cathode electrode and the anode electrode: 82.5 μm
Pitches of the cathode electrodes and the anode electrodes: 400 μm
Inner diameter of the first penetrating end of the penetrating hole: 85 μm
Inner diameter of the second penetrating end of the penetrating hole: 85 μm
Thickness of the insulation member: 400 μm Resolution of the radiation detection element 10 according to the first example was 120 μm. When 530-550V was applied between the cathode electrode and the anode electrode, the gas-amplification factor was 12000.

The gas amplification factor Z is obtained by dividing the charge QA(C) after the gas amplification by the charge QB(C) of the primary electrons generated by one radiation. For example, if the radiation source is Ba133, the charges QB(C) of electrons (primary electrons) generated from one radiation can be expressed by the following formula.

$$QB(C) = (\text{energy of one X-ray/W value of Ar}) \times 1.6 \times 10^{-19} \text{ C} = (31 \text{ keV}/26 \text{ eV}) \times 1.6 \times 10^{-19} \text{ C}$$

On the other hand, the charge QA(C) after the gas amplification can be obtained by reading one analog signal output from the signal processing circuit with an oscilloscope, and calculating from the wave height (mV) on the vertical axis, the time (nanosecond) on the horizontal axis, and the constant of the circuit.

Resolution (spatial resolution) can be obtained from the shortest distance that can be detected as two independent points by detecting the radiation transmitted through the slits of varying widths composed of shielding material.

Example 2

The radiation detection device 100a was manufactured using the radiation detection element 10a according to the second embodiment. The parameters of the detection element according to the second example are as follows.
Width of the cathode electrode: 350 μm
Opening diameter of the cathode electrode: 250 μm
Diameter of the anode electrode: 85 μm
Distance between the cathode electrode and the anode electrode: 82.5 μm
Pitches of the cathode electrodes and the anode electrodes: 400 μm
Inner diameter of the first penetrating end of the penetrating hole: 50 μm
Inner diameter of the second penetrating end of the penetrating hole: 85 μm
Thickness of the insulation member: 400 μm Resolution of the radiation detection element 10a according to the second example was 120 μm. When 530-550V was applied between the cathode electrode and the anode electrode, the gas-amplification factor was 13000.

Example 3

The radiation detection device 100a was manufactured using the radiation detection element 10a according to the second embodiment. The parameters of the detection element according to the third example are as follows.
Width of the cathode electrode: 350 μm
Opening diameter of the cathode electrode: 250 μm
Diameter of the anode electrode: 60 μm
Distance between the cathode electrode and the anode electrode: 95 μm
Pitches of the cathode electrodes and the anode electrodes: 400 μm
Inner diameter of the first penetrating end of the penetrating hole: 50 μm
Inner diameter of the second penetrating end of the penetrating hole: 85 μm
Thickness of the insulation member: 400 μm
Resolution of the radiation detection element 10a of the third example was 120 μm. When 530-550V was applied between the cathode electrode and the anode electrode, the gas amplification factor was 17500.

Example 4

The radiation detection device 100b was manufactured using the radiation detection element 10b according to the third embodiment. T parameters of the detection element according to the fourth example are as follows.
Width of the cathode electrode: 350 μm
Opening diameter of the cathode electrode: 250 μm
Diameter of the anode electrode: 85 μm
Distance between the cathode electrode and the anode electrode: 82.5 μm
Pitches of the cathode electrodes and the anode electrodes: 400 μm
Inner diameter of the first penetrating end of the penetrating hole: 85 μm
Inner diameter of the second penetrating end of the penetrating hole: 50 μm
Thickness of the insulation member: 400 μm
Resolution of the radiation detection element 10b according to the fourth example was 120 μm. When 530-550V was applied between the cathode electrode and the anode electrode, the gas amplification factor was 12000.

Example 5

The radiation detection device 100c using the radiation detection element 10c according to the fourth embodiment was manufactured. The parameters of the detection element according to the fifth example are as follows.
Width of the cathode electrode: 350 μm
Opening diameter of the cathode electrode: 250 μm
Diameter of the anode electrode: 60 μm
Distance between the cathode electrode and the anode electrode: 95 μm
Pitches of the cathode electrodes and the anode electrodes: 400 μm
Inner diameter of the first penetrating end of the penetrating hole: 50 μm
Inner diameter of the second penetrating end of the penetrating hole: 50 μm
Minimum inner diameter of the penetrating hole: 25 μm
Thickness of the insulation member: 400 μm
Resolution of the radiation detection element 10c according to the fifth example was 120 μm. When 530-550V was applied between the cathode electrode and the anode electrode, the gas-amplification factor was 17500.

Comparative Example 1

The radiation detection device was manufactured using conventional silicon-based radiation detection element. Parameters of the detection element according to the Comparative Example 1 are as follows.
Width of the cathode electrode: 350 μm
Opening diameter of the cathode electrode: 250 μm
Diameter of the anode electrode: 60 μm
Distance between the cathode electrode and the anode electrode: 95 μm
Pitches of the cathode electrodes and the anode electrodes: 400 μm
Inner diameter of the first penetrating end of the penetrating hole: 50 μm
Inner diameter of the second penetrating end of the penetrating hole: 50 μm
Thickness of the insulation member: 400 μm
Resolution of the radiation detection element according to comparative example 1 was 120 μm. When 530-550V was applied between the cathode electrode and the anode electrode, the gas amplification factor was 10000.

Table 1 shows the gas amplification factors and the resolutions of the radiation detection device according to Examples 1 to 5 and Comparative Example 1. Each of the gas amplification factors is shown as a relative value when the gas amplification factor of the Comparative Example 1 is set to 1. Compared to the radiation detection device of the comparative example 1, the gas amplification factors of the radiation detection device of examples 1 to 5 were all improved. The radiation detection device according to the Example 2 as compared with the example 1 and example 4 is that the first penetrating end is small, so that the electric force line from the cathode electrode is concentrated to the anode electrode. Therefore, the radiation detection device according to the example 2 as compared with the example 1 and example 4 was able to obtain a higher gas amplification factor. The radiation detection device of the example 3 and example 5 as compared with the example 2, the density of the electric field lines in the vicinity of anode electrode is increased due to the small anode electrode, a higher gas amplification factor could be obtained.

TABLE 1

| | Pitch (μm) | Anode diameter (μm) | Inner diameter of the first penetrating end (μm) | gas amplification factor (relative values) | Resolution (μm) |
|---|---|---|---|---|---|
| Example1 | 400 | 85 | 85 | 1.2 | 120 |
| Example2 | 400 | 85 | 50 | 1.3 | 120 |
| Example3 | 400 | 60 | 50 | 1.75 | 120 |
| Example4 | 400 | 85 | 85 | 1.2 | 120 |
| Example5 | 400 | 60 | 50 | 1.75 | 120 |
| Comparative Example1 | 400 | 60 | 50 | 1 | 120 |

DESCRIPTION OF SYMBOLS

100: Radiation detection device, 1: Pixel electrode, 102: Insulation member, 103: penetrating hole, 103A: First penetrating end, 103B: Second penetrating end, 104: Cathode electrode, 104A: Connecting terminal, 105: Opening part, 106: Anode electrode, 108: Anode pattern electrode, 110: Drift electrode, 111: Chamber, 112: Anode through electrode, 120: First metal layer, 122: Second metal layer, 124: Lead wiring, 126: Interlayer connection part, 132: Bonding wire, 150: Radiation detection device, 152: Drift cage, 325: Conductive layer, 326: Plating layer, 329: Resist pattern, 330: Adhesive layer, 340: Frame pattern.

What is claimed is:

1. A detection element comprising:
    a substrate that is an inorganic insulator made of a single material and has a first surface and a second surface opposite to the first surface, the substrate being arranged with a through hole having different inner diameters at two points along a thickness direction of the substrate;
    a through electrode arranged in the through hole;
    a first electrode connected to the through electrode, the first electrode being arranged on the first surface;
    a patterned electrode connected to the through electrode, the patterned electrode being arranged on the second surface; and
    a second electrode arranged on the first surface, the second electrode being separated from the first electrode.

2. The detection element according to claim 1, wherein the through hole has an inner diameter of a first penetrating end on the first surface and an inner diameter of a second penetrating end on the second surface different from each other.

3. The detection element according to claim 1, wherein
    the through hole has an inner diameter in the thickness direction of the substrate that is smaller than an inner diameter of a first penetrating end on the first surface and an inner diameter of a second penetrating end on the second surface, and
    the through electrode has a diameter in the thickness direction of the substrate that is smaller than a diameter on the first surface and a diameter on the second surface.

4. The detection element according to claim 3, wherein the substrate is non-alkaline glass, and
    each of the second electrode, the patterned electrode, and the through electrode is in contact with the substrate.

5. The detection element according to claim 1, wherein
    the through hole has an inner diameter of a first penetrating end on the first surface that is smaller than an inner diameter of a second penetrating end on the second surface, and
    the through electrode has a diameter on the first surface that is smaller than a diameter on the second surface.

6. The detection element according to claim 5, wherein the substrate is non-alkaline glass, and
    each of the second electrode, the patterned electrode, and the through electrode is in contact with the substrate.

7. The detection element according to claim 1, wherein an inner diameter of the first electrode on a surface opposite to the first surface is smaller than an inner diameter of a first penetrating end on the first surface.

8. The detection element according to claim 1, wherein an aspect ratio of the through hole is in the range of 4 or more and 8 or less.

9. The detection element according to claim 1, wherein the substrate is glass.

10. The detection element according to claim 1, wherein a diameter of the first electrode on a surface opposes to the first surface is in a range of 100 μm or less.

11. The detection element according to claim 1, wherein the second electrode includes an opening that surrounds the first electrode.

12. The detection element according to claim 1, wherein
    the first electrode includes a plurality of first electrodes and the through electrode includes a plurality of through electrodes,
    the patterned electrode is connected to the plurality of through electrodes, the plurality of through electrodes is connected to the plurality of first electrodes respectively,
    the second electrode includes a plurality of second electrodes and the pattern electrode includes a plurality of pattern electrodes, and
    an extending direction of the plurality of second electrodes is different from the extending direction of the plurality of patterned electrodes.

13. The detection element according to claim 1, wherein the substrate is non-alkaline glass, and
    each of the second electrode, the patterned electrode, and the through electrode is in contact with the substrate.

14. A detection device comprising a detection element, the detection element comprising:
    a substrate having a first surface and a second surface opposite to the first surface, the substrate being arranged with a through hole having different inner diameters at two points along a thickness direction of the substrate;
    a through electrode arranged in the through hole;
    a first electrode connected to the through electrode, the first electrode being arranged on the first surface;
    a patterned electrode connected to the through electrode, the patterned electrode being arranged on the second surface; and
    a second electrode arranged on the first surface, the second electrode being separated from the first electrode;
    wherein the detection device has a resolution of 150 μm or less and a gas amplification factor of 12000 or more when 530 to 550V is applied between the first electrode and the second electrode.

15. A production method for detection element comprising:
    forming a through hole on a substrate that is an inorganic insulator made of a single material and has a first surface and a second surface opposite to the first surface, the through hole having different inner diameters at two points along a thickness direction of the substrate;
    forming a through electrode in the through hole;
    forming a first electrode connected to the through electrode and a second electrode separated from the first electrode on the first surface; and
    forming a patterned electrode connected to the through electrode on the second surface.

16. The production method according to claim 15, wherein forming the through hole includes forming through hole having a tapered shape from the second side of the substrate at angle of 91° or more and 95° or less with respect to the second side.

17. The production method according to claim 15, wherein forming the through hole includes using a laser.

18. The production method according to claim 15, wherein forming the first electrode includes forming a diameter of the first electrode on a surface opposed to the first surface smaller than a diameter of a first penetrating end on the first surface of the through hole.

19. The production method according to claim 15, wherein forming through hole includes forming an aspect ratio ranging in a range of 4 or more and 8 or less.

20. The production method for detection element according to claim 15, wherein
    the substrate is non-alkaline glass, and
    each of the second electrode, the patterned electrode, and the through electrode is formed so as to be in contact with the substrate.

\* \* \* \* \*